US008499358B2

(12) United States Patent
Murakami et al.

(10) Patent No.: US 8,499,358 B2
(45) Date of Patent: Jul. 30, 2013

(54) PROGRAM EXECUTING PROCESSING AND CONTROLLING

(75) Inventors: Masakazu Murakami, Itami (JP); Hironobu Nakata, Itami (JP); Kazumi Sawayanagi, Itami (JP); Minako Kobayashi, Ikeda (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1053 days.

(21) Appl. No.: 10/732,373

(22) Filed: Dec. 11, 2003

(65) Prior Publication Data
US 2005/0060564 A1 Mar. 17, 2005

(30) Foreign Application Priority Data

Sep. 12, 2003 (JP) ................................. 2003-320699
Sep. 12, 2003 (JP) ................................. 2003-320700

(51) Int. Cl.
*H04L 9/00* (2006.01)
(52) U.S. Cl.
USPC ................ 726/28; 726/26; 380/243; 358/443
(58) Field of Classification Search
USPC .......................... 726/28, 26; 380/243; 358/443
See application file for complete search history.

(56) References Cited

U.S. PATENT DOCUMENTS

| | | | | |
|---|---|---|---|---|
| 5,675,645 A * | 10/1997 | Schwartz et al. | ............. | 713/187 |
| 5,892,904 A * | 4/1999 | Atkinson et al. | ................. | 726/22 |
| 5,968,175 A * | 10/1999 | Morishita et al. | ............... | 726/28 |
| 6,289,344 B1 * | 9/2001 | Braia et al. | ............................. | 1/1 |
| 6,735,699 B1 * | 5/2004 | Sasaki et al. | ..................... | 726/28 |
| 6,947,949 B2 * | 9/2005 | Fujisawa | ............................... | 1/1 |
| 6,959,289 B1 * | 10/2005 | James et al. | ..................... | 705/51 |
| 7,076,652 B2 * | 7/2006 | Ginter et al. | .................. | 713/153 |
| 7,096,491 B2 * | 8/2006 | Cheng | ............................... | 726/4 |
| 7,124,302 B2 * | 10/2006 | Ginter et al. | .................. | 713/189 |

(Continued)

FOREIGN PATENT DOCUMENTS

| JP | 09-130532 | 5/1997 |
|---|---|---|
| JP | 09-247307 | 9/1997 |

(Continued)

OTHER PUBLICATIONS

"Unix Permissions" web page dated May 7, 1997 as verified by the Internet Archive. (3 pages) http://web.archive.org/web/19970507081221/http://www.acm.uiuc.edu/webmonkeys/html_workshop/unix.html.*

(Continued)

*Primary Examiner* — Beemnet Dada
*Assistant Examiner* — Thomas Gyorfi
(74) *Attorney, Agent, or Firm* — Buchanan Ingersoll & Rooney PC

(57) ABSTRACT

A processing device is provided in which unauthorized processing is prevented from being preformed at the time of executing a program or others. The processing device includes a processing portion for executing processing, a program memory portion for memorizing a program that makes the processing portion execute processing, a judge portion for judging whether or not the program is permitted to start, and a control portion for controlling the processing portion so that processing is executed in accordance with the program when the judge portion determines that the program is permitted to start, and for controlling the processing portion so that processing based on the program is not executed when the judge portion determines that the program is not permitted to start.

11 Claims, 23 Drawing Sheets

U.S. PATENT DOCUMENTS

| | | | | |
|---|---|---|---|---|
| 7,133,845 B1 * | 11/2006 | Ginter et al. | | 705/51 |
| 7,133,846 B1 * | 11/2006 | Ginter et al. | | 705/54 |
| 7,165,174 B1 * | 1/2007 | Ginter et al. | | 713/153 |
| 7,174,567 B2 * | 2/2007 | Keramane | | 726/26 |
| 7,178,169 B1 * | 2/2007 | Salmonsen et al. | | 726/31 |
| 7,213,266 B1 * | 5/2007 | Maher et al. | | 726/26 |
| 2001/0034846 A1 * | 10/2001 | Beery | | 713/201 |
| 2002/0112171 A1 * | 8/2002 | Ginter et al. | | 713/185 |
| 2003/0014661 A1 | 1/2003 | Ohi | | |

FOREIGN PATENT DOCUMENTS

| | | |
|---|---|---|
| JP | 2001-103270 | 4/2001 |
| JP | 2002-132726 | 5/2002 |
| JP | 2002-169621 | 6/2002 |
| JP | 2002-351563 | 12/2002 |
| JP | 2003-122588 | 4/2003 |
| JP | 2003-229978 | 8/2003 |

OTHER PUBLICATIONS

"Hara-Kiri (exDontouch)" webpage dated Apr. 2, 2002 by the Internet Archive. © 1999, 2002 CyberTech Group http://web.archive.org/web/20020402222509/http://www.cyteg.com/prg/hara-kiri/download.htm.*

"Method (computer science)" definition from Wikipedia, originally published Aug. 3, 2008 http://en.wikipedia.org/w/index.php?title=Method_(computer_science)&oldid=1600073.*

Java™ 2 Platform, Standard Edition, v1.3.1 API Specification. © 1993-2001 Sun Microsystems Inc. http://java.sun.com/j2se/1.3/docs/api/overview-summary.html.*

Java™ 2 Platform, Standard Edition, v1.3.1 java.io class File. © 1993-2001 Sun Microsystems Inc. http://java.sun.com/j2se/1.3/docs/api/java/io/File.html.*

Java™ 2 Platform, Standard Edition, v1.3.1 java.net class Socket © 1993-2001 Sun Microsystems Inc. http://java.sun.com/j2se/1.3/docs/api/java/net/Socket.html.*

Simon, Richard. "Microsoft Windows 2000 API Superbible" Published Sep. 13, 2000 by Sams Inc. Excerpt from Chapter 17 (93 pages).*

Garfinkel, Simson. "Web Security, Privacy, and Commerce, 2nd Edition" © 2001 O'Reilly Media Inc. (pp. 569-587).*

Orenstein, David. "QuickStudy: Application Programming Interface (API)" Dated Jan. 10, 2000 by Computerworld.com (2 pages) http://www.computerworld.com/s/article/print/43487/Application_Programming_Interface?taxonomyName=App+Development&taxonomyId=11.*

"API—Webopedia Definition and Links" Article dated Jan. 21, 2001 as verified by the Internet Archive (1 page) http://web.archive.org/web/20010121 1045/http://www.webopedia.com/TERM/A/API.html.*

Simon, Richard. "Microsoft Windows 2000 API SuperBible" © 2000 Sams Publishing Inc. Excerpt from Chapters 14, 17, and 18 (215 pages total).*

* cited by examiner

FIG.6
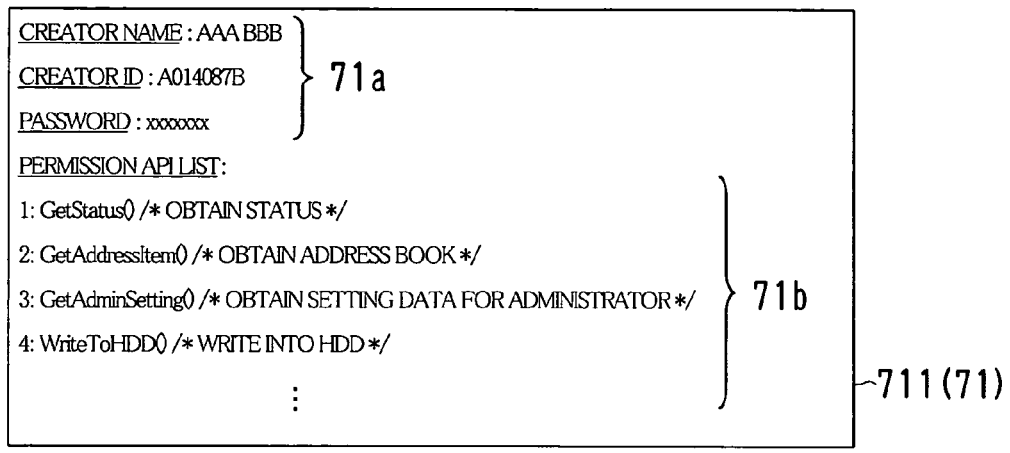
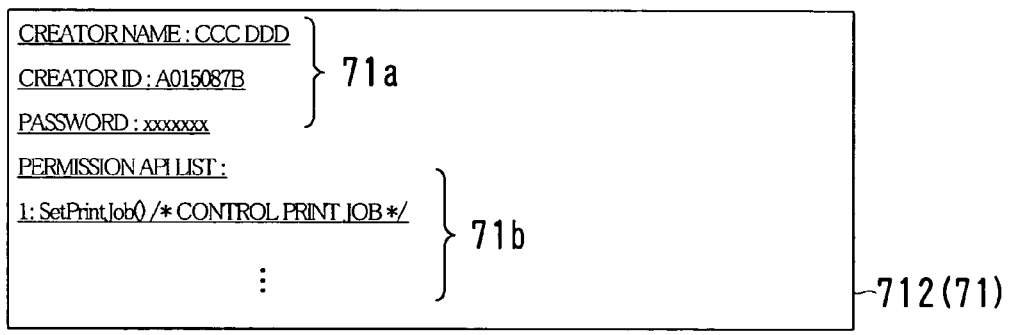

HG1

HG2

HG3

PROGRAM EXECUTING PROCESSING AND CONTROLLING

This application is based on Japanese Patent Application Nos. 2003-320699 filed on Sep. 12, 2003, and 2003-320700 filed on Sep. 12, 2003, the contents of which are hereby incorporated by reference.

BACKGROUND OF THE INVENTION

1. Field of the Invention

The present invention relates to a processing device such as a multifunction device for executing processing in accordance with programs obtained by download or other ways, to a method for controlling such a processing device and to others.

2. Description of the Related Art

In recent years, an operating system (OS) with a high-performance application program interface (API) has been adopted to various devices in addition to devices such as a personal computer and a workstation. Such an OS is employed in a multifunction peripheral (MFP) in which functions of a copier, a printer, a scanner, a fax machine, a document server or others are consolidated and in other devices.

When an API was not sophisticated, it was difficult and time-consuming to create programs for expanding functionality of these devices or for performing applied processing. The reason was that an understanding of device structures and program coding using a language such as a machine language were required.

However, adoption of a high-performance API enabled to invoke various functionality for performing processing merely by calling API functions that are prepared in advance. In this way, programming is performed easier compared to the conventional ways.

Accordingly, programs for expanding functionality of the devices or for performing applied processing, and service providers creating and providing these programs will increase in the future. This leads to an advantage that users can use devices more conveniently and, on the other hand, to a problem that a defective program or a malicious program executing undesirable processing to cause damage to users is easily distributed.

Additionally, it is expected that a program for updating important data or system construction of a device, both of which should be acquired and used only by a system administrator, will be readily created for distribution. If so, a user, who is not an intended user, can acquire such a program and perform an improper operation, so that important data may be lost or a device may break down.

In order to prevent these problems, some sorts of checks are required at the time of executing a program in a device.

According to an invention disclosed in Japanese unexamined patent publication No. 2002-169621, when an application program is downloaded to a terminal device, a user of the terminal device is authenticated. Then, only when the user is authenticated, the application program is downloaded to the terminal device. Likewise, according to inventions disclosed in Japanese unexamined patent publication Nos. 2002-132726 and 2001-103270, predetermined processing including download is performed when a user is identified.

However, according to these conventional inventions, program providers only confirm the identity (authentication) of a user intending to use a program. Accordingly, it is impossible to know as to whether or not the program is a defective program, a malicious program or a program operating improperly at the user's device.

SUMMARY OF THE INVENTION

The present invention is directed to solve the problems pointed out above, and therefore, an object of the present invention is to prevent unauthorized processing from being performed in a processing device at the time of executing a program or others obtained from external devices.

According to one aspect of the present invention, a processing device includes a processing portion for executing processing, a program memory portion for memorizing a program that makes the processing portion execute processing, a judge portion for judging whether or not the program is permitted to start, and a control portion for controlling the processing portion so that processing is executed in accordance with the program when the judge portion determines that the program is permitted to start, and for controlling the processing portion so that processing in accordance with the program is not executed when the judge portion determines that the program is not permitted to start.

A processing device may be provided with plural processing portions. A processing device may include processing portions, for example, each of which performs scanning, printing, copying, transmission and reception of a facsimile, transmission and reception of a file or document management.

In order to solve the problems discussed previously more effectively, the processing portion may be controlled by the following structures.

More particularly, first, a processing device includes a creator information memory portion for memorizing first creator information used for identifying a creator of a program, the first creator information being prepared for each creator of a program, a program obtaining portion for obtaining a program from an external device along with second creator information used for identifying a creator who created the program, an authenticity judge portion for determining a program obtained by the program obtaining portion as an authorized program created by an authorized creator when the creator information memory portion memorizes the first creator information having the same contents as the second creator information obtained together with the program, and for determining the program obtained by the program obtaining portion as an unauthorized program created by an unauthorized creator when the creator information memory portion does not memorize the first creator information having the same contents as the second creator information obtained together with the program, and a control portion for controlling the processing portion so that, with respect to a program determined to be an authorized program by the authenticity judge portion, processing is executed in accordance with the program, and for controlling the processing portion so that, with respect to a program determined to be an unauthorized program, processing based on the program is stopped.

Secondly, a processing device includes a program obtaining portion for obtaining a program from an external device, a use approval/disapproval information memory portion for memorizing use approval/disapproval information indicating whether or not a creator of a program is permitted to use a function included in the processing portion, the program being obtained by the program obtaining portion, a use approval/disapproval judge portion for determining whether or not a creator of a program obtained by the program obtaining portion is authorized to use the function corresponding to a code included in the program based on the use approval/ disapproval information, and a control portion for controlling the processing portion so that the function is called to execute processing when the use approval/disapproval judge portion determines that the creator of the program obtained by the program obtaining portion is authorized to use the function corresponding to the code included in the program, and for controlling the processing portion so that processing based on the program is stopped when the use approval/disapproval judge portion determines that the creator is not authorized to use the function.

Thirdly, a processing device includes a function calling portion for invoking a function corresponding to a code described in a program out of functions included in the processing portion, a program obtaining portion for obtaining a program from an external device, a use approval/disapproval information memory portion for memorizing use approval/disapproval information indicating whether or not a creator of a program is permitted to use the function, the program being obtained by the program obtaining portion, a use approval/disapproval judge portion for determining whether or not a creator of a program obtained by the program obtaining portion is authorized to use the function corresponding to a code described in the program based on the use approval/disapproval information, and a control portion for controlling the function calling portion so that the function is called when the use approval/disapproval judge portion determines that the creator of the program obtained by the program obtaining portion is authorized to use the function corresponding to the code described in the program, and for controlling the processing portion so that processing based on the program is stopped when the use approval/disapproval judge portion determines that the creator is not authorized to use the function.

Fourthly, a processing device includes a use approval/disapproval information memory portion for memorizing use approval/disapproval information for each user, the information indicating whether or not a user is permitted to use a program that makes the processing portion execute processing, a designation reception portion for receiving designation of processing that a user intends the processing portion to execute, a use approval/disapproval judge portion for determining whether or not a user who made the designation is authorized to use the program that makes the processing portion execute processing relating to the designation based on the use approval/disapproval information of the user, and a control portion for controlling the processing portion so that processing is executed in accordance with the program when the use approval/disapproval judge portion determines that the user is authorized to use the program, and for controlling the processing portion so that processing based on the program is not executed when the use approval/disapproval judge portion determines that the user is not authorized to use the program.

Fifthly, a processing device includes a use approval/disapproval information memory portion for memorizing use approval/disapproval information for each user, the information indicating whether or not a user is permitted to use a function included in the processing portion, a designation reception portion for receiving designation of processing that a user intends the processing portion to execute, a use approval/disapproval judge portion for determining whether or not a user who made the designation is authorized to use the function corresponding to a code included in a program that makes the processing portion execute processing relating to the designation based on the use approval/disapproval information of the user, and a control portion for controlling the processing portion so that the function is called to execute processing when the use approval/disapproval judge portion determines that the user is authorized to use the function corresponding to the code included in the program, and for controlling the processing portion so that processing based on the program is stopped when the use approval/disapproval judge portion determines that the user is not authorized to use the function.

As the function calling portion, it is possible to use a portion for managing an application program interface of an operating system of the processing device. The use approval/disapproval information memory portion may be included in a device other than the processing device.

These and other characteristics and objects of the present invention will become more apparent by the following descriptions of preferred embodiments with reference to drawings.

BRIEF DESCRIPTION OF THE DRAWINGS

FIG. 6 shows examples of creator access privileges information.

DESCRIPTION OF THE PREFERRED EMBODIMENTS

First Embodiment

Figure 1:
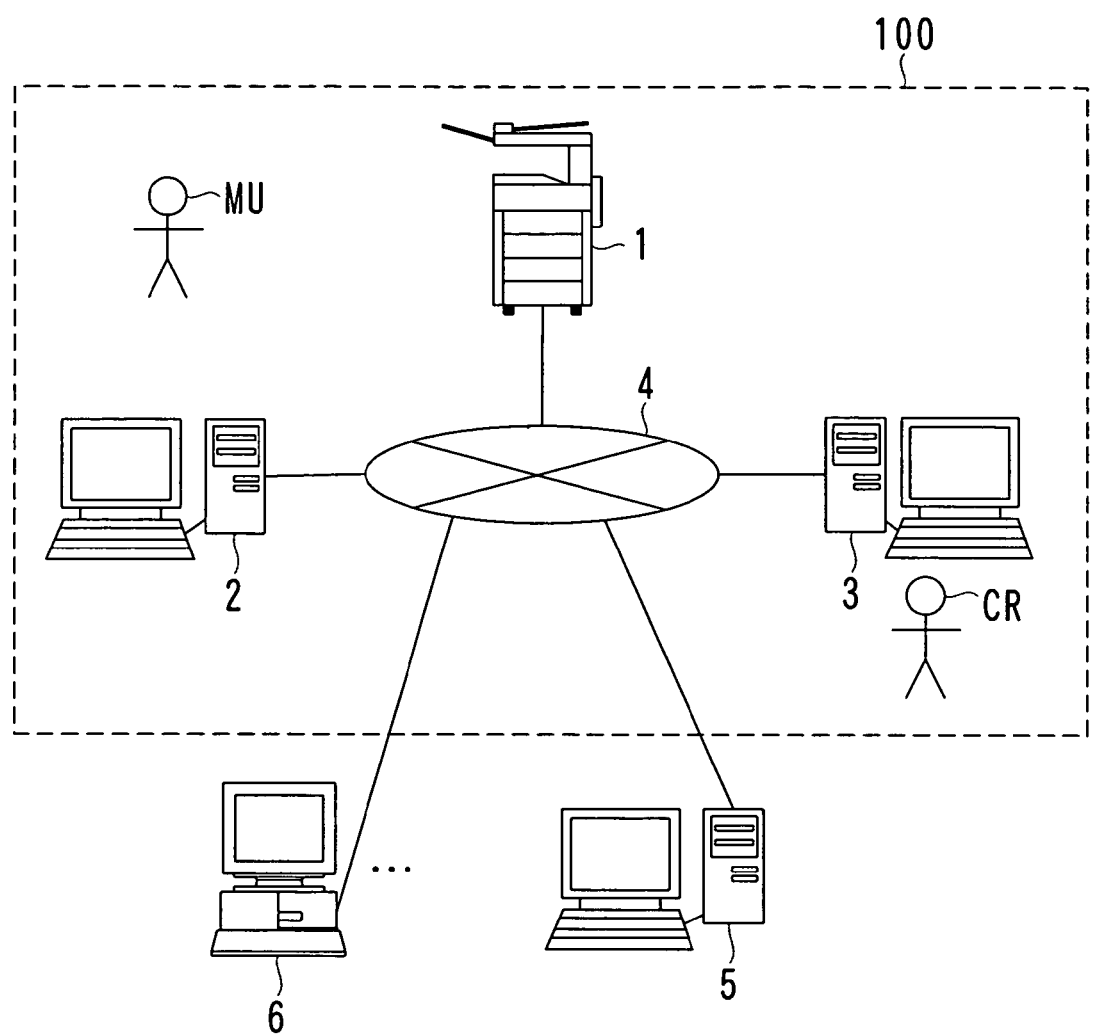
FIG. 1 is a diagram showing an example of the entire structure of a program sharing system.
Figure 2:
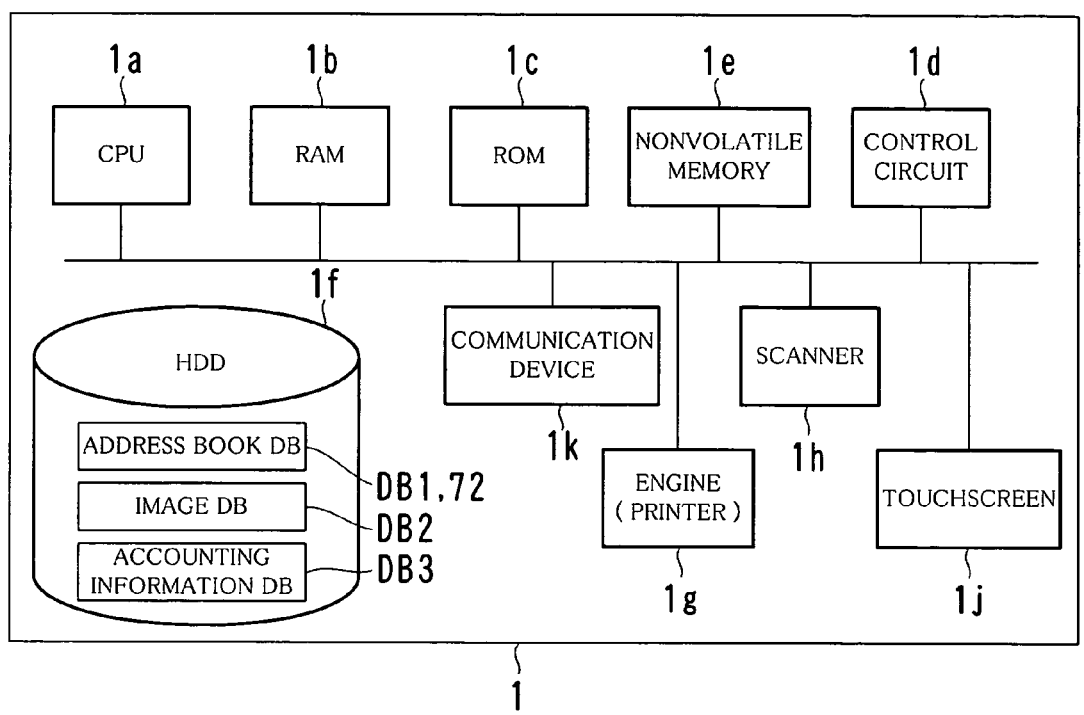
FIG. 2 is a diagram showing an example of a hardware structure of a multifunction device.
Figure 3:
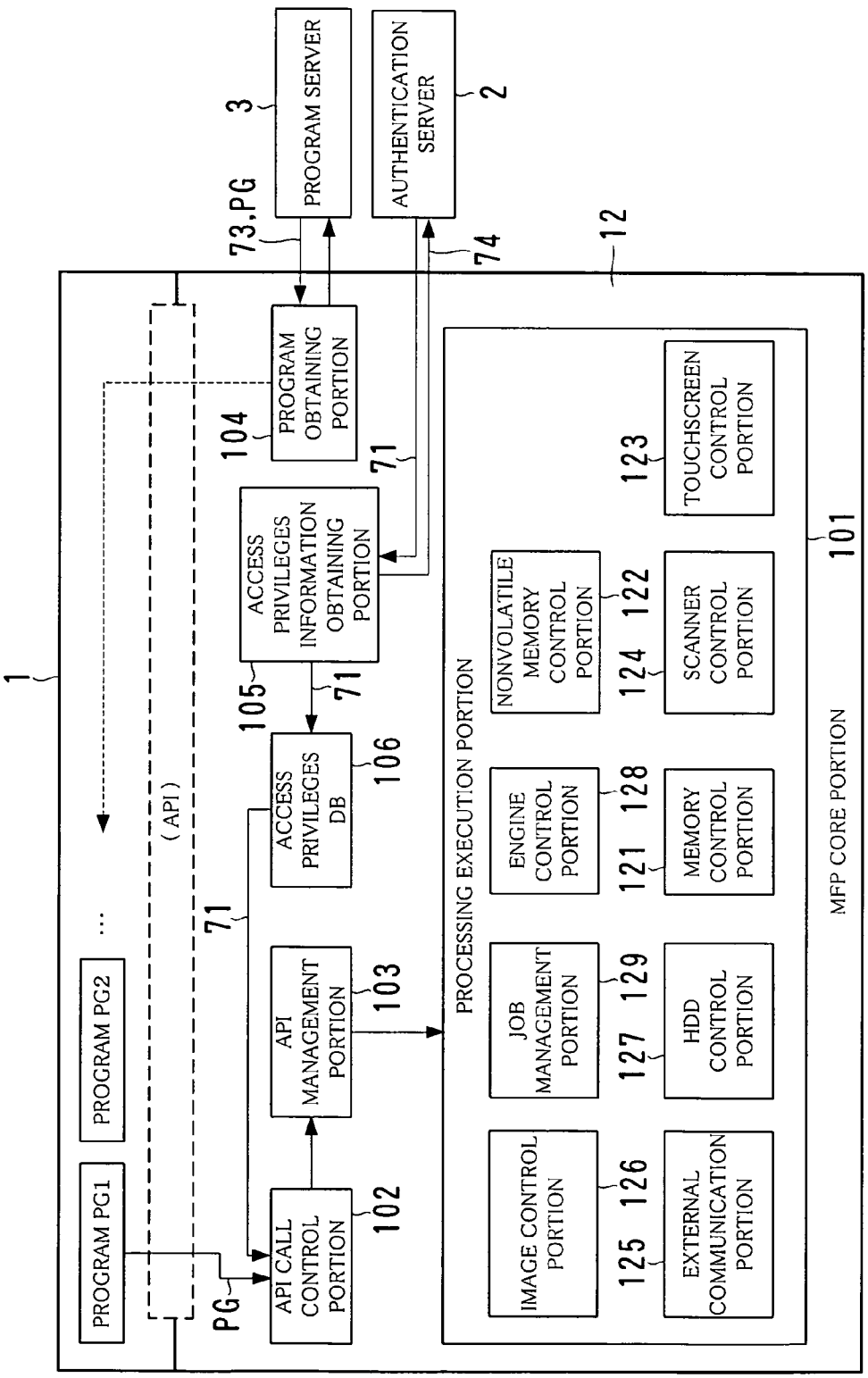
FIG. 3 is a diagram showing an example of a functional structure of the multifunction device according to a first embodiment.
Figure 4:
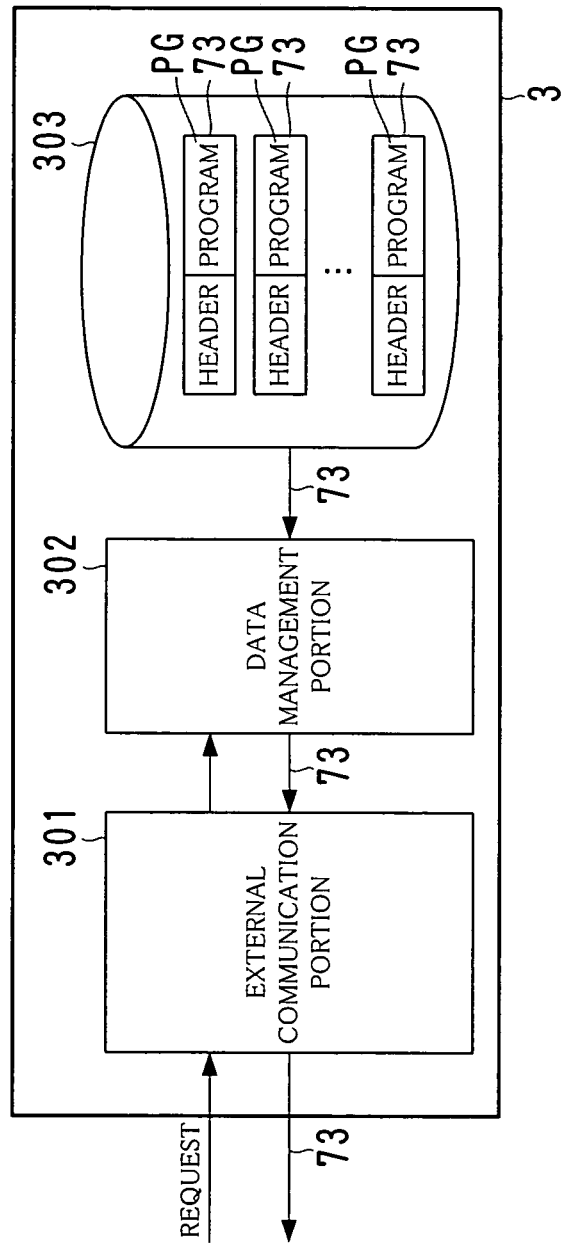
FIG. 4 is a diagram showing an example of a functional structure of a program server according to the first embodiment.
Figure 5:
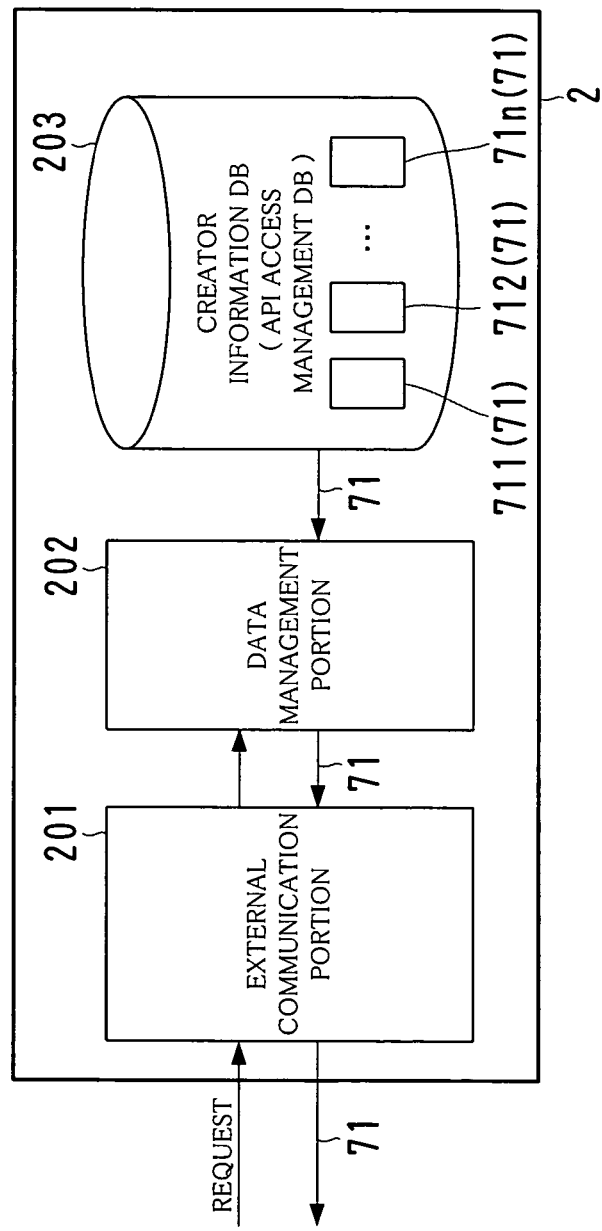
FIG. 5 is a diagram showing an example of a functional structure of an authentication server according to the first embodiment.
Figure 7:
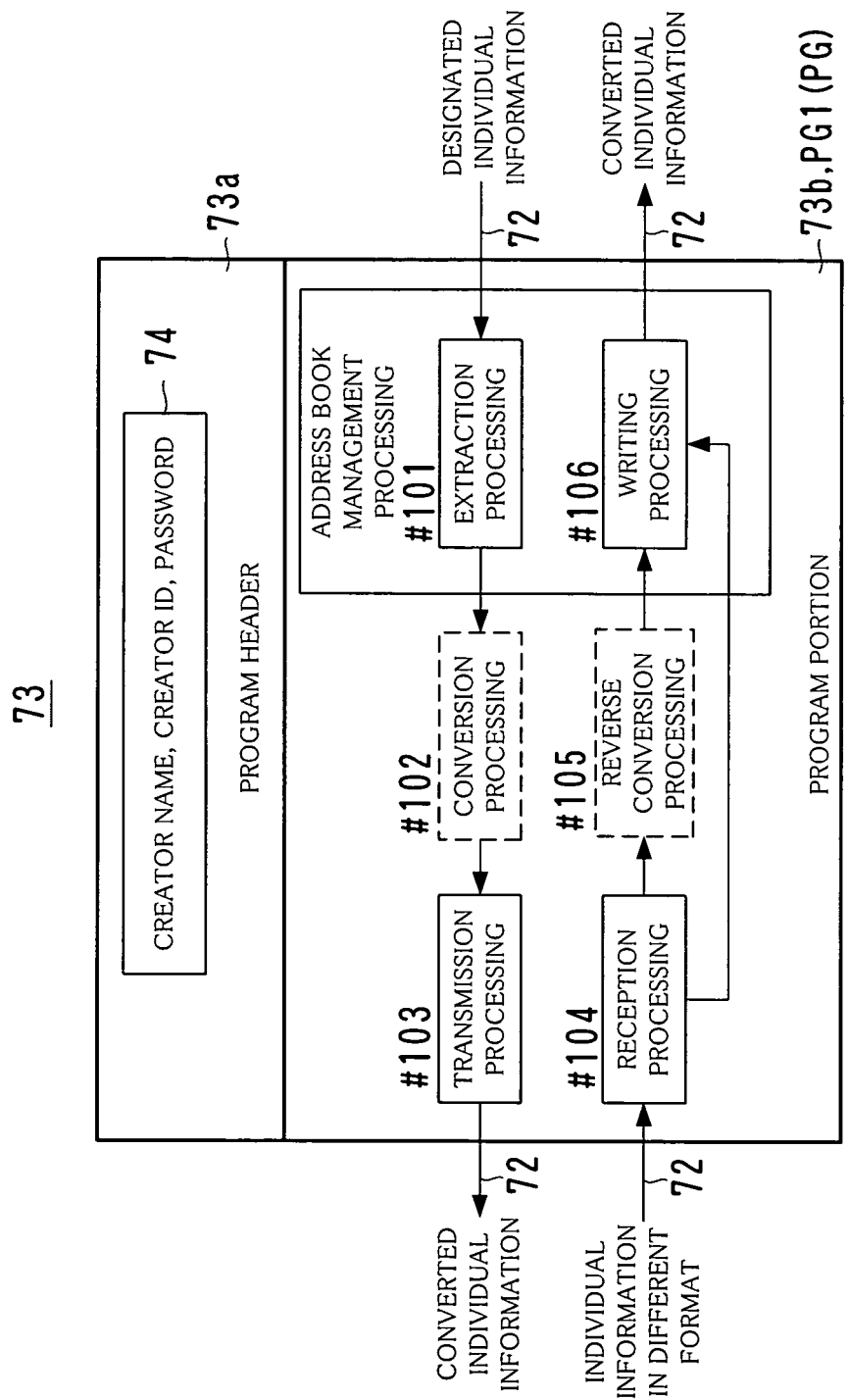
FIG. 7 is a diagram showing an example of a program file structure and processing contents of an address book management program according to the first embodiment.
Figure 8:
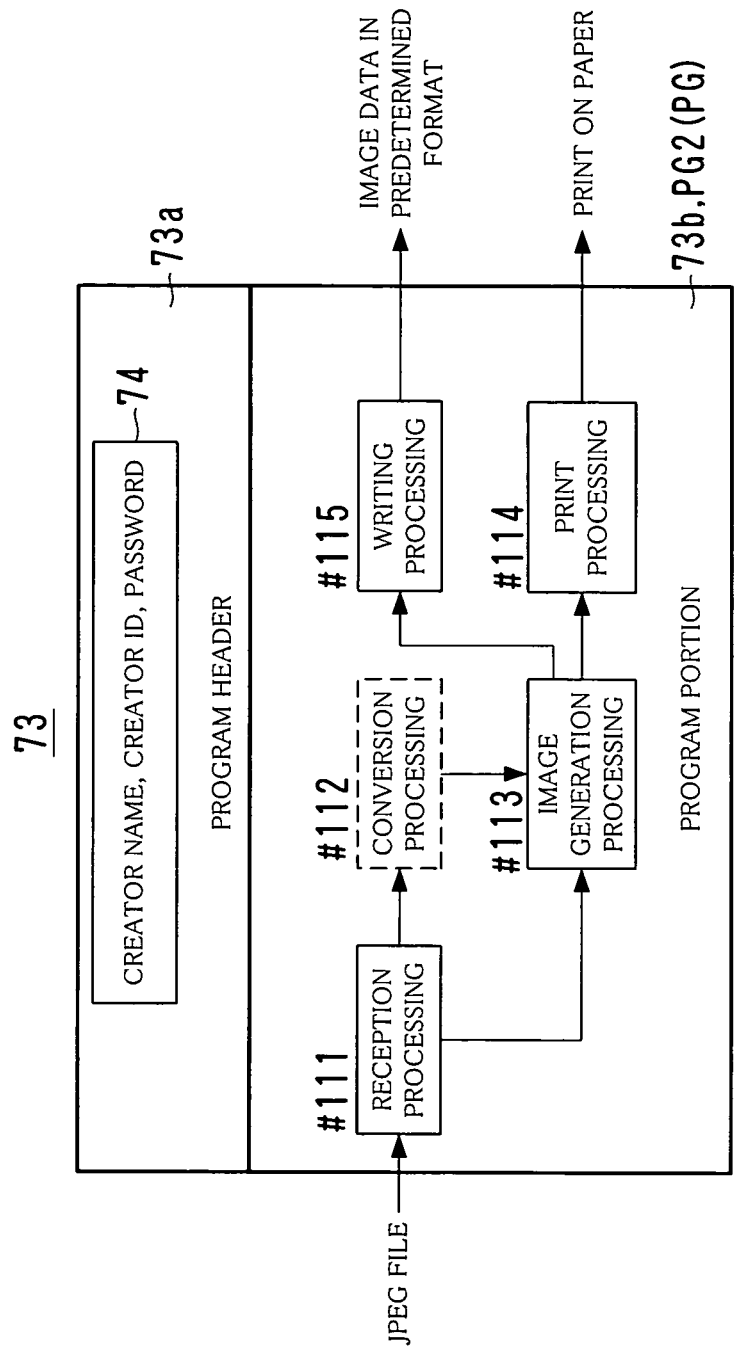
FIG. 8 is a diagram showing an example of a program file structure and processing contents of an image processing program according to the first embodiment.

FIG. 1 is a diagram showing an example of the entire structure of a program sharing system 100. FIG. 2 is a diagram showing an example of a hardware structure of a multifunction device 1. FIG. 3 is a diagram showing an example of a functional structure of the multifunction device 1 according to a first embodiment. FIG. 4 is a diagram showing an example of a functional structure of a program server 3 according to the first embodiment. FIG. 5 is a diagram showing an example of a functional structure of an authentication server 2 according to the first embodiment. FIG. 6 shows examples of creator access privileges information 71. FIG. 7 is a diagram showing an example of a structure of a program file 73 and processing contents of an address book management program according to the first embodiment. FIG. 8 is a diagram showing an example of a structure of a program file 73 and processing contents of an image processing program according to the first embodiment.

As shown in FIG. 1, the program sharing system 100 includes the multifunction device 1, the authentication server 2 and the program server 3. These devices can be connected to each other via a network 4. The Internet, an intranet, a public line, a dedicated line or the like is used as the network 4. Communication protocol can be TCP/IP, FTP, HTTP or others.

The multifunction device 1 is a device where functions of a copier, a printer, a scanner, a fax machine, a document server or others are consolidated, and is sometimes called a multifunction peripheral (MFP). Referring to FIG. 2, the multifunction device 1 includes a CPU 1*a*, a RAM 1*b*, a ROM 1*c*, a control circuit 1*d*, a nonvolatile memory 1*e*, a magnetic storage device (a hard disk drive) 1*f*, a printer 1*g*, a scanner 1*h*, a touchscreen 1*j* and a communication device 1*k*.

The communication device 1*k* serves to exchange data with a fax terminal, a personal computer or others (hereinafter referred to as an external terminal device 6) located outside the authentication server 2, the program server 3 or the program sharing system 100. The control circuit 1*d* serves to control all parts configuring the multifunction device 1.

The nonvolatile memory 1*e* is a rewritable and nonvolatile memory such as an EEPROM or a flash memory. The ROM 1*c* is a read-only memory. Although a ROM is generally included in a nonvolatile memory, in the first embodiment, the ROM is distinguished from the EEPROM or the flash memory. Accordingly, the former is referred to as the "ROM 1*c*", while the latter is referred to as the "nonvolatile memory 1*e*".

On the magnetic storage device 1*f* are installed, as an operating system (OS), programs and data for realizing functions of various portions including a processing execution portion 101, an API call control portion 102, an API management portion 103, a program obtaining portion 104, an access privileges information obtaining portion 105 and an access privileges database 106, all of which are shown in FIG. 3. Stated differently, these functions form an MFP core portion 12 that is a central portion of the multifunction device 1.

On the magnetic storage device 1*f* are further memorized an address book database DB1, an image database DB2, an accounting information database DB3 and others. The address book database DB1 stores individual information 72 indicating a name, a company name, an address, a telephone number, a fax number or an e-mail address or others of a user (a user MU shown in FIG. 1, for example) using the multifunction device 1, business partners of the user or the like. The image database DB2 stores image data received from the external terminal device 6, image data read by the scanner 1*h* or others. The accounting information database DB3 stores information required for charge processing for the use of the multifunction device 1, for example, the information including data relating to usage of the multifunction device 1 for each user.

All or part of these programs or data memorized in the magnetic storage device 1*f* may be memorized in the ROM 1*c* or the nonvolatile memory 1*e*. Alternatively, all or part of the functions shown in FIG. 3 may be realized by a processing device (the control circuit 1*d*). These programs and data are loaded on the RAM 1*b* as required and the programs are executed by the CPU 1*a*.

The program server 3 includes an external communication portion 301, a data management portion 302 and a program database 303 as shown in FIG. 4. The program server 3 memorizes application programs that can be executed by the multifunction device 1 (hereinafter referred to as "program(s) PG") and serves to provide the program PG via the network 4 in response to a request from the multifunction device 1. The program server 3 is operated by a manufacturer (maker) of the multifunction device 1, an agency (dealer) of the manufacturer, a third party or others.

The authentication server 2 includes an external communication portion 201, a data management portion 202 and a creator information database 203 as shown in FIG. 5. The authentication server 2 memorizes creator access privileges information 71 relating to a creator CR of each of the programs PG and serves to provide the creator access privileges information 71 via the network 4 in response to a request from the multifunction device 1. The authentication server 2 is operated by the maker of the multifunction device 1.

The authentication server 2 and the program server 3 can be server machines having a function of data transmission, for example, can be an FTP server or an HTTP server.

When a creator CR wishes a user of the multifunction device 1 to use a created program PG, the creator CR uploads the program PG to the program server 3 through the network 4 so as to publish the program PG. The user of the multifunction device 1 can access the program server 3, download the program PG into the multifunction device 1 and use the program PG.

However, when creator access privileges information 71 of the creator CR is not registered in the authentication server 2, the program PG cannot start up and executed in the multifunction device 1. Further, even if the creator access privileges information 71 is registered, when predetermined requirements are not satisfied, processing in the program PG stops. A detailed explanation will be given to these respects later.

Hereinafter, an explanation is made to all portions of the multifunction device 1, the authentication server 2 and the program server 3, the portions being shown in FIGS. 3-5.

The processing execution portion 101 in FIG. 3 includes a memory control portion 121, a nonvolatile memory control portion 122, a touchscreen control portion 123, a scanner control portion 124, an external communication portion 125, an image control portion 126, an HDD control portion 127, an engine control portion 128 and a job management portion 129. The processing execution portion 101 controls hardware configuring the multifunction device 1 and performs image processing.

The memory control portion 121 controls the RAM 1*b* (see FIG. 2). The memory control portion 121, for example, writes data into the RAM 1*b*, reads data stored in the RAM 1*b*, manages a memory space and performs other processing. The nonvolatile memory control portion 122 writes data into the nonvolatile memory 1*e*, reads data stored in the ROM 1*c* or the nonvolatile memory 1*e* and performs other processing.

The touchscreen control portion 123 displays an operation screen, a setting screen or others, determines a position where a user touches in the touchscreen 1*j* and performs other processing. In other words, the touchscreen control portion 123 performs processing relating to a user interface.

The scanner control portion 124 makes the scanner 1*h* read an image of a document placed on a document set glass, i.e., conducts processing for controlling the scanner 1*h* to obtain image data. The external communication portion 125 controls the communication device 1*k* to perform processing for sending and receiving data to and from the authentication server 2, the program server 3, the external terminal device 6 or others.

The image control portion 126 performs image processing such as change in resolution, enlargement or reduction of an image size, color correction, tilt correction, strikethrough correction or halftone dot correction for image data obtained from the external terminal device 6 or others, image data memorized in the magnetic storage device 1*f*, image data of an image read by the scanner 1*h* or other image data.

The HDD control portion 127 performs processing for reading out the programs and data memorized in the magnetic storage device 1*f* or for storing the obtained programs and data on a predetermined area such as a database or a directory in the magnetic storage device 1*f*.

The engine control portion 128 controls the printer 1*g* in such a manner as to print an image based on image data obtained by the scanner 1*h* or the communication device 1*k*, image data subjected to the image processing by the image control portion 126 or others.

The job management portion 129 manages processing order of jobs arising in the multifunction device 1, or others. The jobs include a job of transmitting data to the external terminal device 6 using facsimile, e-mail or the like, a job of printing based on image data and a job of scanning a document.

The API management portion 103 manages an application program interface (API) for invoking each functionality of each of the portions structuring the processing execution portion 101. The API management portion 103 defines contents of the functionality as a function to manage by appending a function name such as "GetAddressItem( )" to the functionality. Hereinafter, such a function is called an "API function".

On the multifunction device 1 are prepared plural API functions for writing data into the magnetic storage device 1*f*, obtaining a status, obtaining an address book (the individual information 72), writing data including the individual information 72 into the magnetic storage device 1*f*, obtaining setting data for an administrator, sending a facsimile, transmitting e-mail, controlling a print job, downloading data and performing other processing.

A creator CR can create a program PG easily using the APIs. More specifically, when the creator CR intends to invoke (call) certain functionality, the creator CR may describe an API function corresponding to the functionality in the program PG. In this case, parameters can be described in parentheses of the API function, if necessary.

The program obtaining portion 104 downloads a program PG from the program server 3 to store the same in a predetermined storage medium (the RAM 1*b*, the nonvolatile memory 1*e* or the magnetic storage device 1*f*). When the multifunction device 1 is expanded, for example, the program obtaining portion 104 downloads a new program PG for the expansion from the program server 3. The access privileges information obtaining portion 105 obtains the creator access privileges information 71 of a creator CR from the authentication server 2 to store the same in the access privileges database 106. An API function is provided for each functionality realized by the program obtaining portion 104 and the access privileges information obtaining portion 105. The designation of the API function and necessary parameters allows for calling of functionality, resulting in execution of desired processing.

The creator access privileges information 71 (711, 712 . . . ) of each creator CR is stored in the creator information database 203 of the authentication server 2 as shown in FIG. 5. The creator access privileges information 71 includes creator information 71*a* and use approval/disapproval information 71*b* as shown in FIG. 6.

The creator information 71*a* includes information relating to a creator name, a creator ID and a password. The "creator name" is a name of the creator CR. If some creators CR create a program PG, a company name or a group name is given as the creator name. The "creator ID" is identification information for distinguishing the creator CR. The "password" is used to authenticate that the creator CR is an authorized creator. The use approval/disapproval information 71*b* includes a permission API list showing API functions of functionality that the creator CR has permission to use.

A creator CR without the creator access privileges information 71 informs an administrator of the authentication server 2, e.g., a maker of the multifunction device 1, of his/her name or others and requests the administrator to issue the creator access privileges information 71 and to register the creator CR in the creator information database 203.

The administrator of the authentication server 2 determines functionality that the creator CR can obtain permission to use in accordance with a technical skill and reliability of the creator CR. Then, based on the determination result, the administrator sets creator access privileges information 71 of the creator CR to register the same in the authentication server 2.

Referring to FIG. 4, the programs PG are stored as program portions 73*b* of the program files 73 in the program database 303 of the program server 3. The program files 73 have program headers 73*a* in addition to the program portions 73*b*. Referring to FIGS. 7 and 8, in each of the program headers 73*a* is described creator information 74 indicative of a creator name, a creator ID, a password or others of a creator CR of the program PG. The creator information 74 may be described in the program header 73*a* after being encrypted.

The creator access privileges information 71 and the programs PG are transmitted from the authentication server 2 or the program server 3 to the multifunction device 1 in the following procedure. For example, when a user designates a desired program PG for the multifunction device 1, the program obtaining portion 104 shown in FIG. 3 requests the program server 3 to send a program file 73 including the program PG.

Then, the data management portion 302 in FIG. 4 extracts the program file 73 requested by the program database 303, so that the external communication portion 301 sends the program file 73 to the multifunction device 1. Thus, the program file 73 is downloaded onto the multifunction device 1 to be temporarily stored in storage means such as the RAM 1b (see FIG. 2).

The access privileges information obtaining portion 105 shown in FIG. 3 requests the authentication server 2 to transmit the creator access privileges information 71 of the creator CR of the downloaded program PG. On this occasion, the creator information 74 presented in the program header 73a of the program file 73 is transmitted to the authentication server 2.

Then, the data management portion 202 in FIG. 5 searches whether or not the creator information database 203 stores creator access privileges information 71 (see FIG. 6) including creator information 71a conforming to a creator ID and a password indicated in the transmitted creator information 74.

As a result, when the corresponding creator access privileges information 71 is stored in the creator information database 203, the creator CR of the downloaded program file 73 (program PG) is authenticated (judged) as an authorized (qualified) creator. Then, the data management portion 202 approves of transmission of the creator access privileges information 71, so that the external communication portion 201 transmits the same to the multifunction device 1.

The multifunction device 1 stores the creator access privileges information 71 in the access privileges database 106 (see FIG. 3). The program file 73 temporarily stored in the RAM 1b or the like is saved on the magnetic storage device 1f or the nonvolatile memory 1e as required. The touchscreen 1j (see FIG. 2) in the multifunction device 1 displays a message indicating successful download. The API call control portion 102 permits the program PG included in the program file 73 to be started up and be executed.

On the other hand, when the corresponding creator access privileges information 71 including the matching creator information 71a is not stored in the creator information database 203, the data management portion 202 judges the creator CR as an unauthorized creator to refuse transmission of the creator access privileges information 71. Then, the external communication portion 201 notifies the multifunction device 1 of the transmission rejection.

In this case, the API call control portion 102 in the multifunction device 1 prohibits the program PG included in the program file 73 from starting up. Then, the program file 73 stored in the RAM 1b or the like is deleted. Further, the touchscreen 1j displays an error message indicating that since the program PG obtained from the program server 3 is an unqualified program, the program PG cannot start up. This situation means that download of the program PG is eventually unsuccessful.

The multifunction device 1 performs processing sequentially in accordance with codes described in the program PG downloaded successfully. During this series of processing, when a code (a processing code) for processing to be executed next shows an API function, the API call control portion 102 shown in FIG. 3 judges whether or not the API function is specified in the creator access privileges information 71 of the creator CR of the program PG. More particularly, the API call control portion 102 judges whether or not permission of the use of functionality corresponding to the API function is given to the creator CR of the program PG.

When judging that the API function is included, i.e., permission of the use is given, the API call control portion 102 issues a command to call functionality corresponding to the API function and execute predetermined processing for the API management portion 103. The API management portion 103 controls the processing execution portion 101 based on such a command and, if necessary, on the designated parameters.

When deciding that no permission of the use is given, the API call control portion 102 does not call the corresponding API function to halt processing by the program PG. Then, the touchscreen 1j displays an error message indicating that unpermitted and unauthorized processing was intended to be executed. Alternatively, it is possible to make a user select whether or not functionality corresponding to the API function may be called to continue the processing.

When the next processing code is not an API function, a command is issued to each of the portions of the multifunction device 1 without involving the APIs. Thus, processing by each unit of the multifunction device 1 in FIG. 2 is performed.

Figure 9:
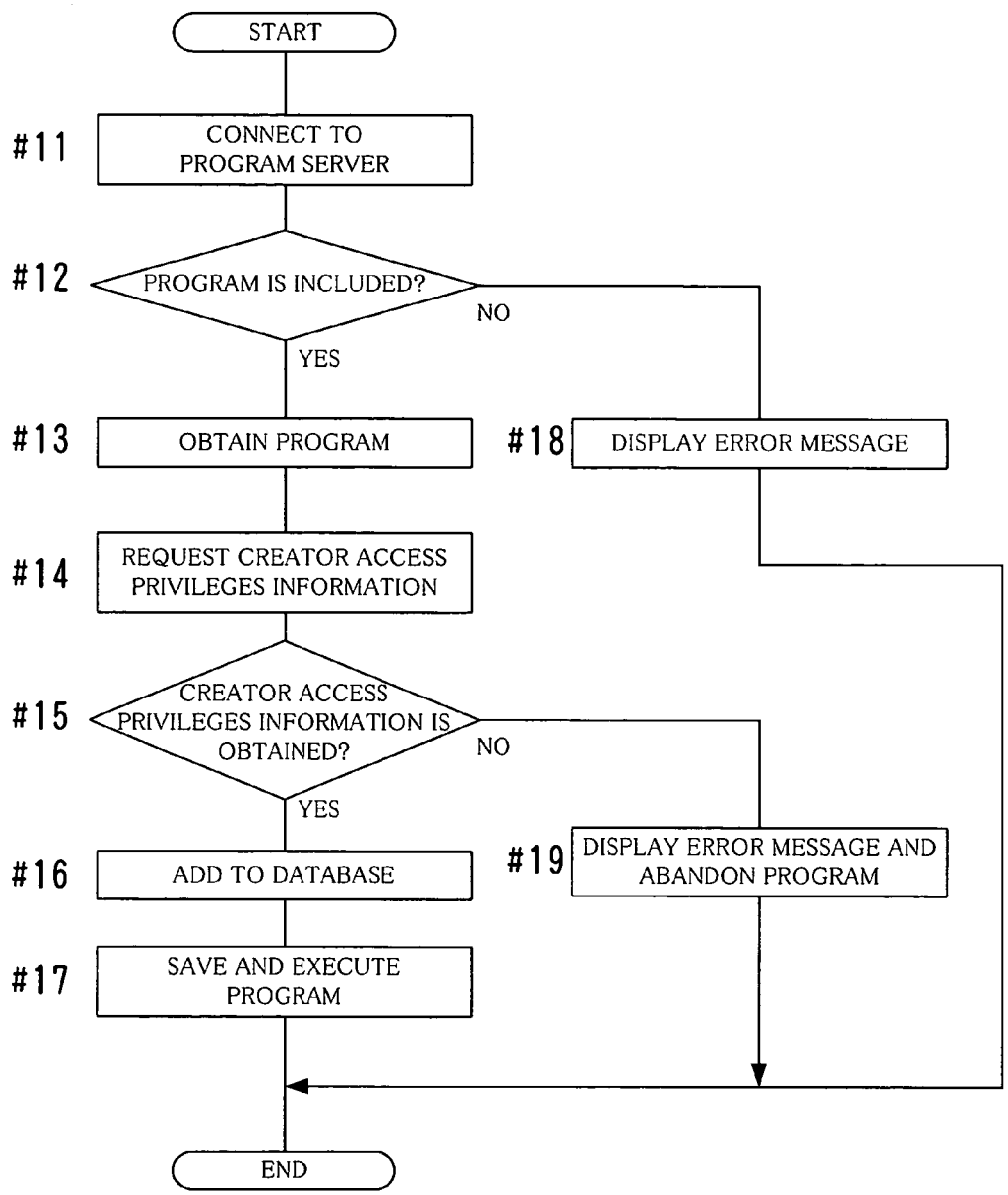
FIG. 9 is a flowchart showing an example of processing in the multifunction device at the time of obtaining a program.
Figure 10:
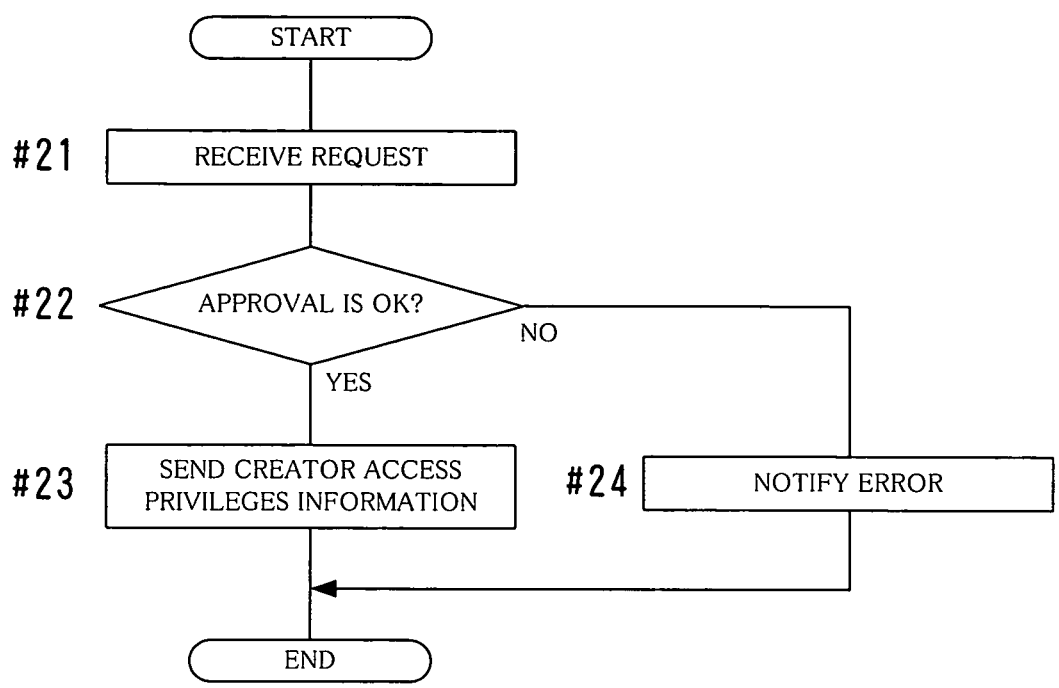
FIG. 10 is a flowchart showing an example of processing in the authentication server in the case of transmitting the creator access privileges information.
Figure 11:
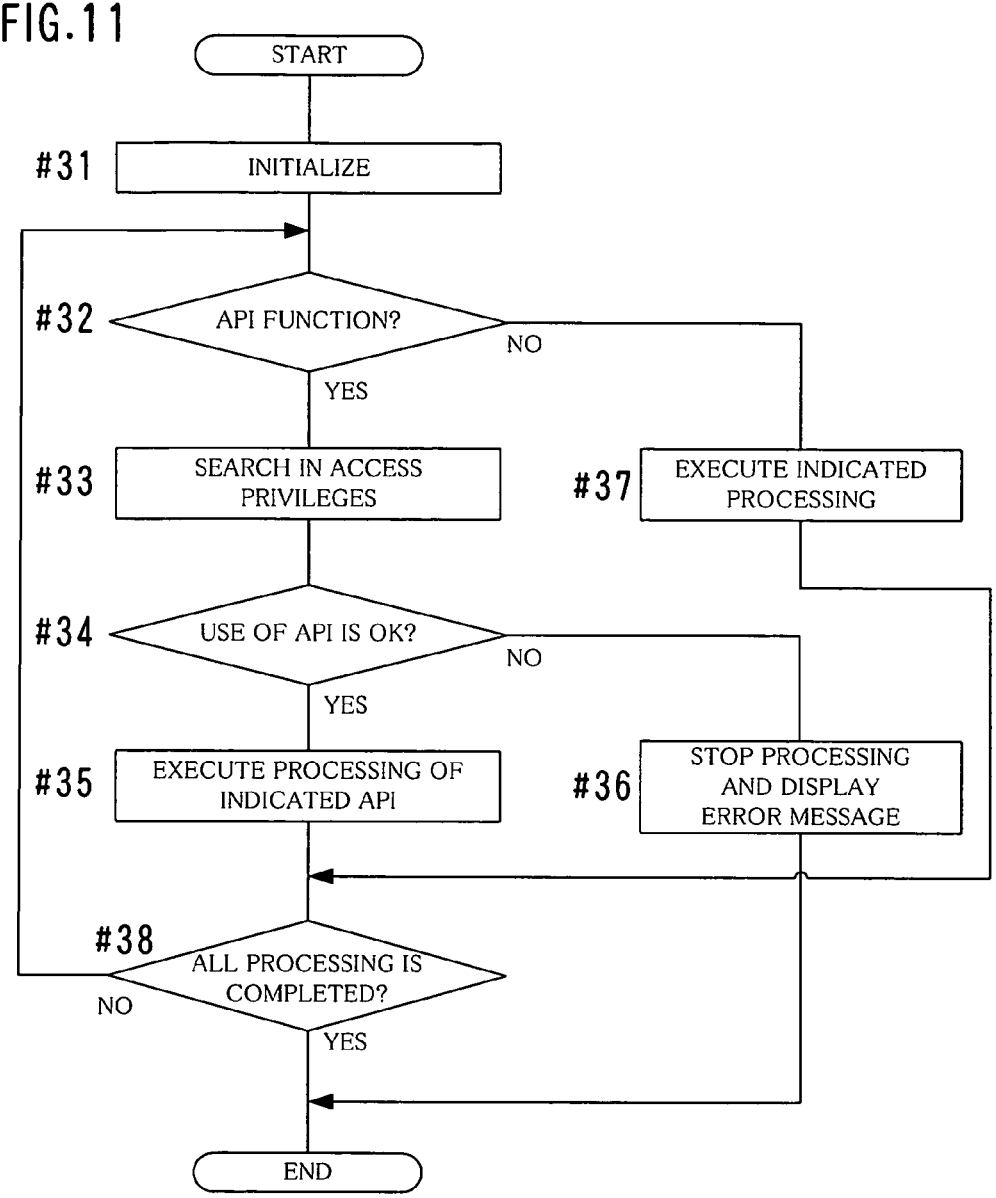
FIG. 11 is a flowchart showing an example of processing in the multifunction device at the time of executing a program.

FIG. 9 is a flowchart showing an example of processing in the multifunction device 1 at the time of obtaining a program PG. FIG. 10 is a flowchart showing an example of processing in the authentication server 2 in the case of transmitting the creator access privileges information 71. FIG. 11 is a flowchart showing an example of processing in the multifunction device 1 at the time of executing a program PG. The CPU executes programs stored in a magnetic storage device, a ROM or others of each of the devices, so that each processing shown in FIGS. 9-11 is realized.

Next, an explanation is given of processing flow of each device in the program sharing system 100 at the time of downloading and executing a program PG with reference to flowcharts.

For instance, when a user operates the touchscreen 1j (see FIG. 2) to designate his/her desired program PG, as shown in FIG. 9, the multifunction device 1 connects to the program server 3 publishing the program PG to request transmission of a program file 73 where the program PG is described (#11).

Responding to the request, the program server 3 searches the requested program file 73 to send the same to the multifunction device 1 that made the request. Thereby, the multifunction device 1 obtains the program PG (Yes in #12, and #13). When the requested program file 73 is not included (No in #12), the touchscreen 1j displays an error message indicating as such (#18).

The multifunction device 1 presents creator information 74 (see FIG. 6) described in a program header 73a of the obtained program file 73 to the authentication server 2. Then, the multifunction device 1 requests the authentication server 2 to transmit creator access privileges information 71 of a creator CR of the program PG (#14).

Referring to FIG. 10, after receiving the request (#21), the authentication server 2 searches in the creator information database 203 (see FIG. 5) to extract creator access privileges information 71 having the same creator ID as that in the creator information 74 presented by the multifunction device 1. Then, the authentication server 2 judges whether or not the password in the creator information 74 is identical to the password in the extracted creator access privileges information 71 (#22).

When the creator access privileges information 71 having the same creator ID as that in the creator information 74 is extracted, and passwords in both the information are identical to each other, i.e., when the creator information 74 and the creator information 71a (see FIG. 6) included in the creator access privileges information 71 are identical to each other in contents, the authentication server 2 authenticates the program PG that the multifunction device 1 obtains from the program server 3 as a program created by an authorized creator CR, approves of transmission processing (Yes in #22) and sends the extracted creator access privileges information 71 to the multifunction device 1 that asked for the same (#23).

When the creator access privileges information 71 having the same creator ID as that in the creator information 74 is not extracted, or when passwords in both the information are inconsistent with each other, the authentication server 2 regards the program PG as a program created by an unqualified creator CR (No in #22). Then, the authentication server 2 transmits a notification to the multifunction device 1 that made the request, the notification indicating that since the program PG is created by an unauthorized creator CR, the creator access privileges information 71 cannot be sent (#24).

Referring to FIG. 9, when receiving the creator access privileges information 71 from the authentication server 2 (Yes in #15), the multifunction device 1 stores the same in the access privileges database 106 (see FIG. 3)(#16). Then, the multifunction device 1 saves the program PG obtained from the program server 3 on the magnetic storage device 1f or the nonvolatile memory 1e as required (#17). When the creator access privileges information 71 cannot be received, the multifunction device 1 displays the notification from the authentication server 2 on the touchscreen 1j, deletes and abandons the obtained program file 73 (#19).

Next, execution of the downloaded program PG is described. The timing of execution of the program PG includes: (1) The time when the program PG already saved in the magnetic storage device 1f or others is called. (2) Immediately after downloading the program PG and the creator access privileges information 71 of the creator CR of the program PG.

Most programs PG can be executed at both the timing (1) and (2). Examples of programs PG that need to be executed at the timing (2) include programs whose update frequency is high and whose latest version needs obtaining with every execution of processing. In the case of such a program PG, it is desirable that the program PG is downloaded from the program server 3 every time when the program PG is needed, instead of saving the program PG on the magnetic storage device 1f or others even after downloading the same.

The program PG is executed in the procedure shown in FIG. 11. First, initialization for executing the program PG is implemented (#31). For example, when the program PG is executed at the timing (1), there is a case where no programs PG are stored in the RAM 1b. On this occasion, the program PG saved on the magnetic storage device 1f or others is read out to be loaded on the RAM 1b. Further, the permission API list (see FIG. 6) specified in the creator access privileges information 71 of the creator CR of the program PG is obtained from the access privileges database 106 (see FIG. 3) to be loaded.

It is judged whether or not the first processing code described in the program PG is an API function (#32).

When the first processing code is an API function (Yes in #32), it is searched whether or not the API function is specified in the permission API list in the creator access privileges information 71 (see FIG. 6) of the creator CR of the program PG (#33).

When the API function is specified, it is judged that the API function is permitted to be used (Yes in #34), then to perform an API call for calling functionality corresponding to the API function to execute processing (#35). When the API function is not specified, it is judged that the API function is not allowed to be used (No in #34). Then, execution of the program PG is discontinued and an error message is displayed on the touchscreen 1j, the error message indicating that unauthorized processing was intended to be executed (#36). Alternatively, it is possible to make a user select whether or not such processing may be executed. On this occasion, when the user selects execution of the program PG, the API call shown in Step #35 is performed.

When the processing code described in the program PG is not an API function (No in #32), a command is issued directly to each unit of the multifunction device 1 to execute exactly the same processing as instructions indicated in the processing code, without the API call shown in Step #35, i.e., without involving the APIs (#37).

With respect to the second and later processing codes described in the program PG, processing is executed in the procedure discussed above until all the processing is completed (Yes in #38).

According to the procedure described with reference to FIG. 11, programs PG1 and PG2 shown in FIGS. 7 and 8 respectively are executed as described below. In addition, solid line portions and dotted line portions are illustrated as portions for showing processing in FIGS. 7 and 8. The former means that a processing code for executing the processing is coded using API functions, while the latter means that coding for executing the processing is performed without using API functions.

The program PG1 shown in FIG. 7 is an address book management program for managing the individual information 72 stored in the address book database DB1 (see FIG. 2), i.e., the address book. The program PG1 enables to execute processing of transmitting the individual information 72 designated by a user to the external terminal device 6 and processing of adding the individual information 72 received from the external terminal device 6 to the address book database DB1.

It is supposed that a user of the multifunction device 1 is requested to send individual information 72 of a certain person to the external terminal device 6. The user operates the touchscreen 1j shown in FIG. 2 to start up a program PG, then to designate a name of the person and an e-mail address of the external terminal device 6 or an address on the network. So, the multifunction device 1 executes the program PG to perform processing as follows.

The multifunction device 1 calls functionality corresponding to an API function for extraction processing to extract the individual information 72 of the person from the address book database DB1 (#101). Next, conversion processing is performed, so that the extracted individual information 72 is converted from a format adopted in the multifunction device 1 (hereinafter refereed to as a "standard format") into a format corresponding to the other party (a format of spreadsheet software, for example) (#102). This processing is, however, illustrated as a dotted line portion, i.e., this processing does not depend on an API function. Accordingly, the processing is executed without involving the APIs. Then, the multifunction device 1 calls functionality corresponding to an API function for transmission processing to send the converted individual information 72 to the external terminal device 6 (#103).

When the individual information 72 is transmitted to the multifunction device 1, the multifunction device 1 calls functionality corresponding to an API function for reception processing to store the individual information 72 in a predetermined memory area (#104). In the event that the received individual information 72 is not in the standard format, reverse conversion processing is performed, so that the individual information 72 is converted into the standard format (#105). Then, the multifunction device 1 calls functionality corresponding to an API function for writing processing to register the individual information 72 subjected to the reverse conversion as required on the address book database DB1 (#106).

The program PG2 shown in FIG. 8 is an image processing program for receiving image data from a terminal device to perform image processing or others. When an image file is transmitted to the multifunction device 1 during starting up the program PG2, the multifunction device 1 calls functionality corresponding to an API function for reception processing to store the image file in a predetermined memory area (#111).

In the event that a format of the image file is not supported by the multifunction device 1 (a JPEG file, a PDF file or other files, for example), conversion processing is performed, so that the image file is converted into the standard format (a format for page-description language such as a PCL, for example) (#112). The multifunction device 1 calls functionality corresponding to an API function for image generation processing to convert the image file into bit-mapped data (#113). When "printing" is set as an output mode, the multifunction device 1 calls functionality corresponding to an API function for print processing to print the image on a sheet of paper based on the bit-mapped data (#114). When "HDD" is set as an output mode, the multifunction device 1 calls functionality corresponding to an API function for writing processing to save the bit-mapped data on the image database DB2 (see FIG. 2) in the magnetic storage device 1*f* (#115).

Of each processing shown in FIGS. 7 and 8, with respect to processing to be performed after calling functionality corresponding to an API function, it is checked whether or not the processing is authorized processing before executing the processing (equivalent to #34 in FIG. 11).

According to the first embodiment, the multifunction device 1 checks whether or not a program PG obtained from the program server 3 is created by an authorized creator CR before executing the program PG. Accordingly, it is possible to prevent an unpermitted program PG from being executed beforehand. Further, in the event that an unsuitable code is found in the program PG during executing the program PG, processing is stopped or interrupted, ensuring that unauthorized processing can be prevented more reliably.

Figure 12:
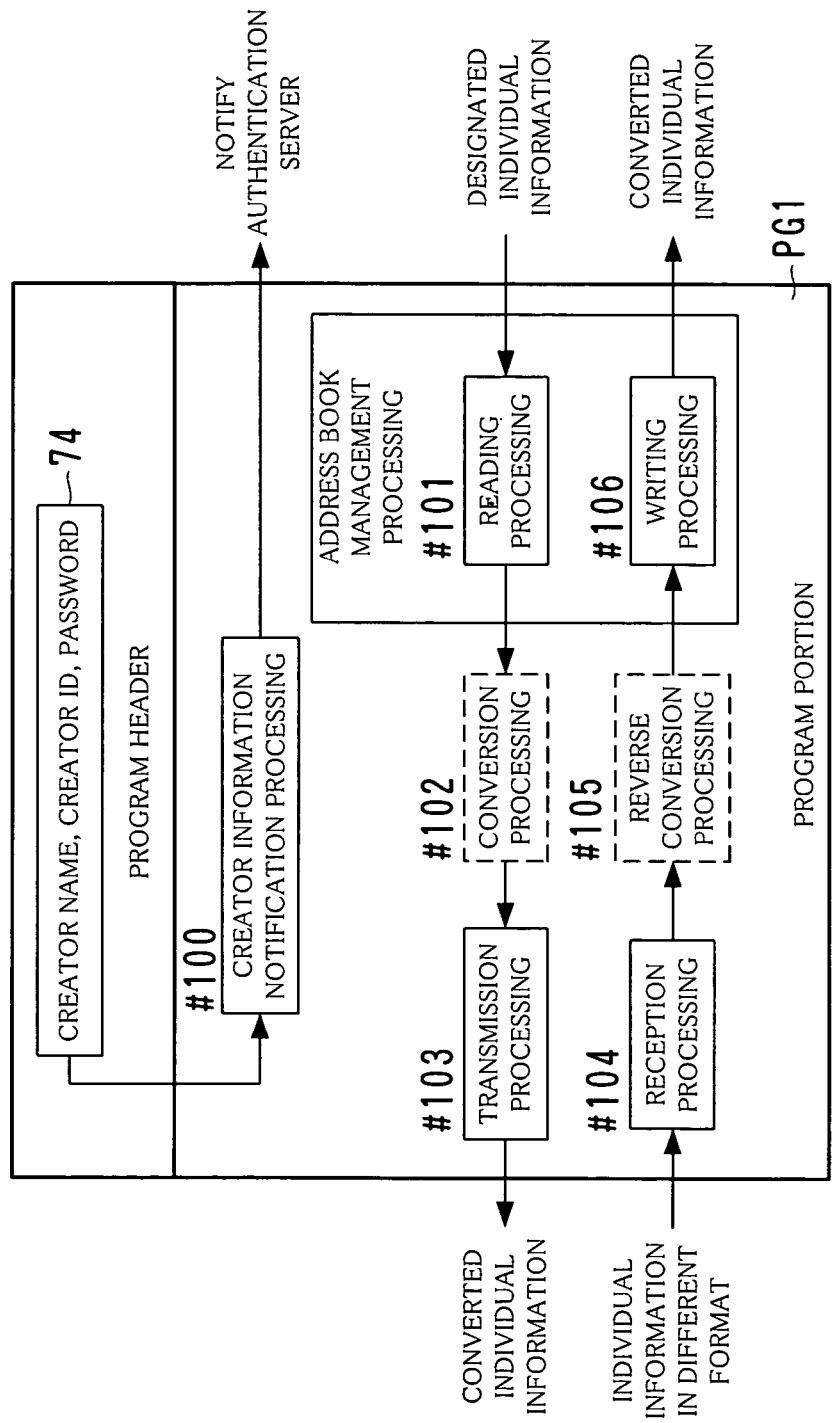
FIG. 12 shows a modification of the program file structure and the processing contents of the address book management program.

FIG. 12 shows a modification of the structure of the program file 73 and the processing contents of the address book management program.

In the first embodiment, an API function for functionality whose permission of the use (call) is given to a creator CR is described (set) in the use approval/disapproval information 71*b* shown in FIG. 6. However, an API function for functionality prohibited from being used may be described. Alternatively, approval/disapproval setting may be performed by classifying all functionality into functionality permitted to be used, functionality available when a user instructs that the functionality may be called, functionality prohibited from being used irrespective of user's intention or other functionality.

On the program PG may be described a processing code for executing processing for obtaining the creator access privileges information 71 of the creator CR of the program PG. Stated differently, an API function for creator information notification processing is described as the first processing code of the program PG as shown in FIG. 12. In this case, as soon as the multifunction device 1 downloads the program PG from the program server 3, the multifunction device 1 starts up the same. Then, the multifunction device 1 calls functionality corresponding to the API function for creator information notification processing, which is described at the top of the program PG, to transmit the creator information 74 of the program PG to the authentication server 2, then to request the creator access privileges information 71 of the creator CR (#100).

Function of each unit in the authentication server 2 shown in FIG. 5 may be included in the multifunction device 1. The creator access privileges information 71 of the creator CR may be settable by a purchaser of the multifunction device 1.

It is possible to check whether or not the program PG is unauthorized and whether or not the program PG includes an unsuitable code also when the program PG recorded on a recording medium such as a CD-ROM is installed on the multifunction device 1.

Programs PG that are often modified (updated) may be automatically re-downloaded every time when the multifunction device is turned on, or at predetermined intervals (every week, for example).

It is also possible to check whether or not an unpermitted code, i.e., an API function for calling functionality that is not allowed for a creator CR is included in a program PG at a time before starting the program PG instead of before processing for each code included in the program PG. The check may be made both before processing for each code and before starting the program PG.

The creator access privileges information 71 and the creator information 74 may be described using a language such as an extensible markup language (XML) or other languages. Further, the creator access privileges information 71 and the creator information 74 may be registered in a management information base (MIB).

The present invention can apply to a multifunction device 1 for downloading programs PG other than the programs PG1 and PG2 that are shown in FIGS. 7 and 8 to execute processing.

For example, the present invention can apply to a multifunction device 1 installed in a common space where many workers gather for jobs, e.g., a company, a tenant building or the like, as follows.

The multifunction device 1 is provided with APIs that can call various functionality (functions) for accounting processing of use fees of the multifunction device 1. More specifically, there are predefined an API function for recording a count (a counter value) such as a copy quantity, the number of times of facsimile transmission or usage of a scanner in the accounting information database DB3 shown in FIG. 2 for each user or each affiliation (a user belongs to), an API function for referring to contents of the accounting information database DB3, an API function for referring to rules at the time of counting, an API function for transmitting an obtained counter value to an external accounting server 5 (see FIG. 1) and an API function for obtaining a setting value indicating what kind of setting is made on each job arose at the time of using the multifunction device 1 by each user, for example, duplex printing, 2-in-1 printing, color printing or others, or for obtaining information for each page.

A maker or a dealer of the multifunction device 1 creates programs PG for realizing new advanced features using such APIs, improves programs PG that are already distributed or fix bugs of programs PG that are already distributed to provide distribution agents (customers) of the multifunction device 1 with the programs PG by publishing the programs PG on the program server 3. For example, the maker or the dealer provides a program PG for making a list of usage for each user based on the referred counter value to transmit the prepared list to the accounting server 5 of an administration department in a company or a caretaker of a tenant building at regular intervals (every week, for example).

This enables to conduct improvement in provision of after-sales service for customers who purchased the multifunction device 1 and users using the multifunction device 1.

Programs PG can be created and published in a software company or others (a third party) other than the maker or the dealer of the multifunction device 1. Accordingly, with respect to functionality having a possibility of leakage of accounting information and a possibility of being used for falsification thereof, it is desirable that the creator access privileges information 71 is so set that permission of the use is given only to creators CR who are reliable and excellent in a technical skill.

The present invention can apply to devices other than multifunction devices (multifunction peripherals), for example, a personal computer, a workstation, a personal digital assistant (PDA), a cellular phone, a home appliance with a function of the Internet (what is commonly called information appliance) or others as long as such devices have APIs.

Second Embodiment

Figure 13:
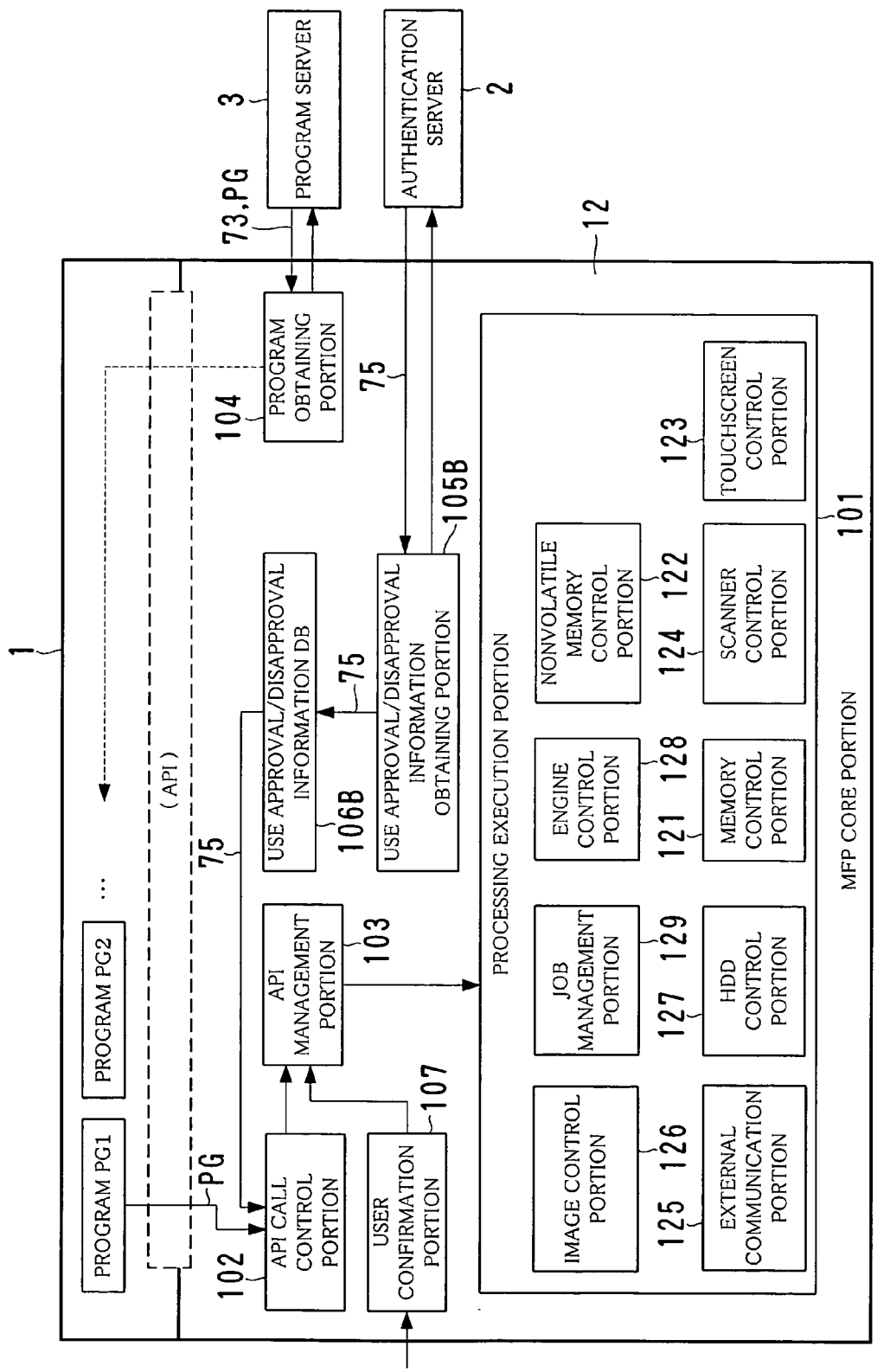
FIG. 13 is a diagram showing an example of a functional structure of a multifunction device according to a second embodiment.
Figure 14:
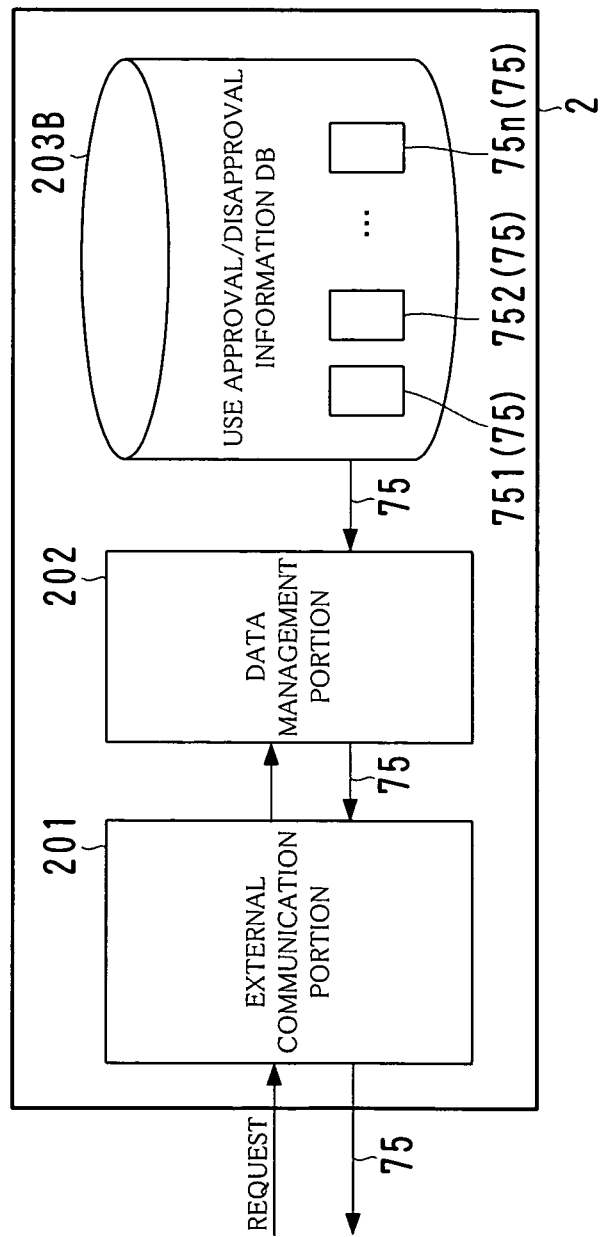
FIG. 14 is a diagram showing an example of a functional structure of an authentication server according to the second embodiment.
Figure 15:
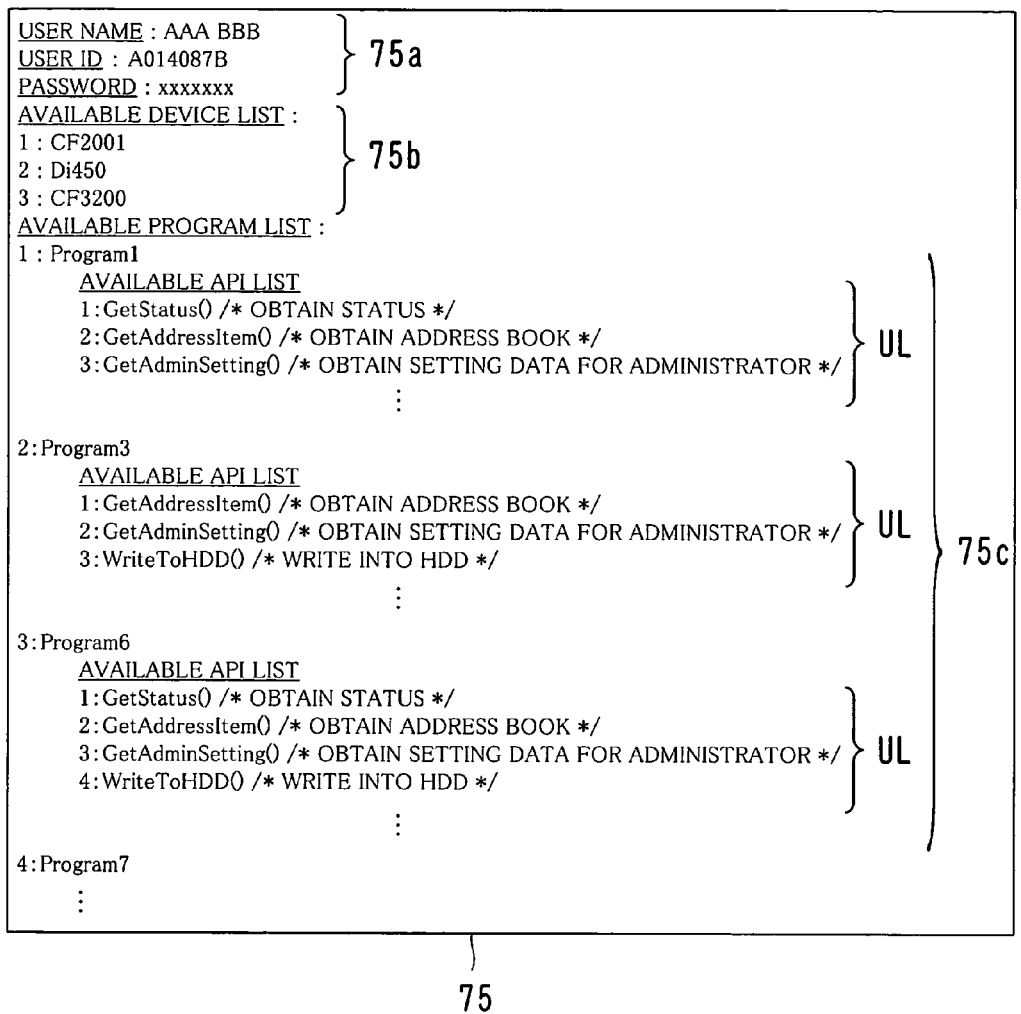
FIG. 15 shows an example of contents of use approval/disapproval information.
Figure 16:
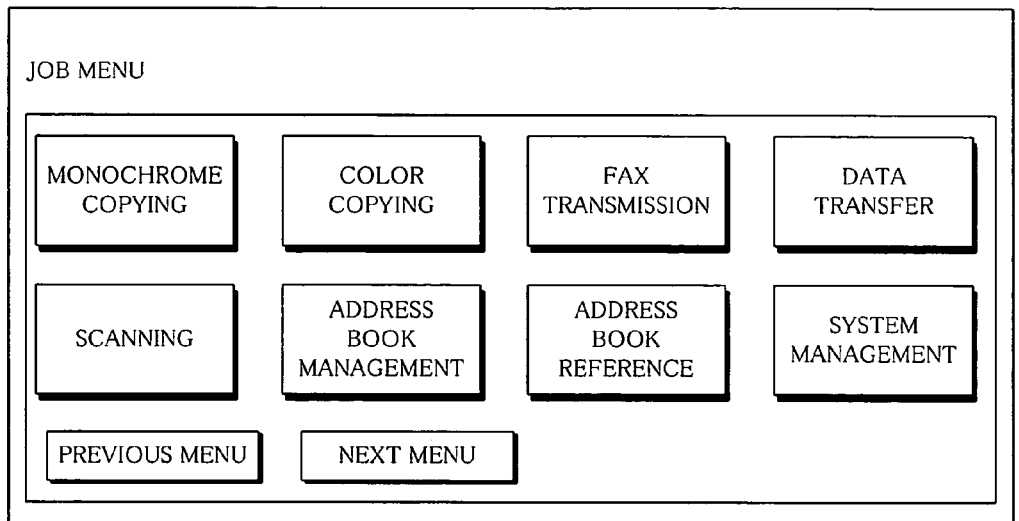
FIG. 16 shows an example of a menu selection screen.
Figure 17:
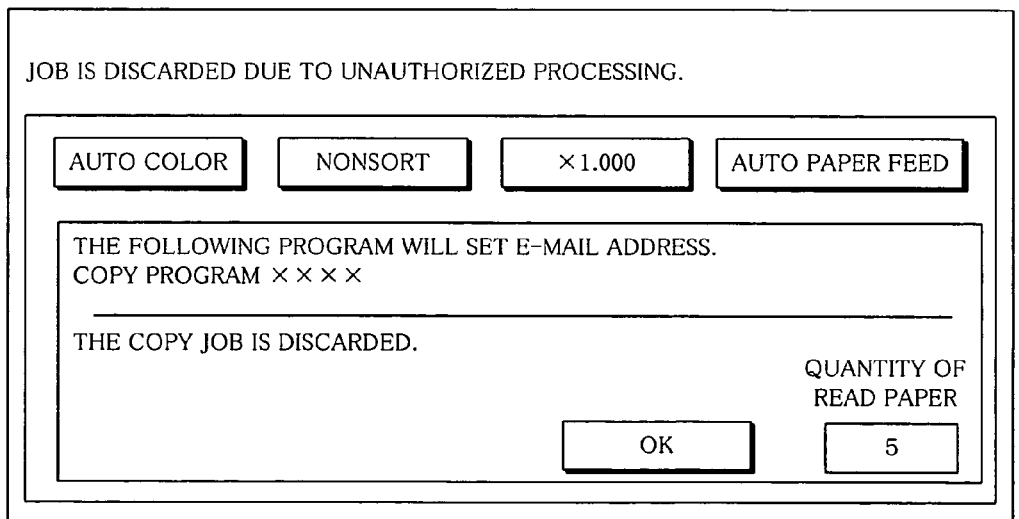
FIG. 17 shows an example of a processing halt notification screen.
Figure 18:
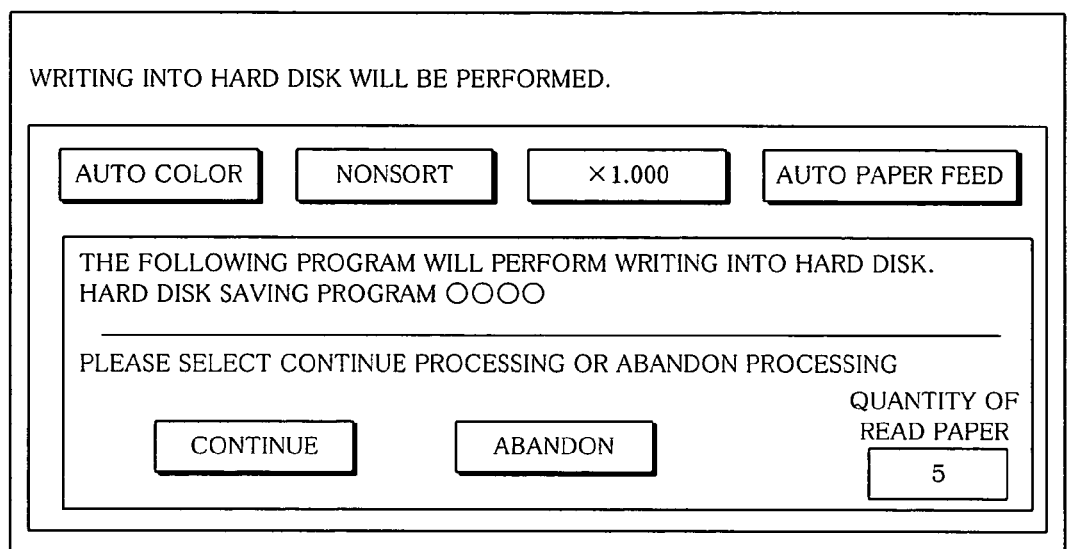
FIG. 18 shows an example of a processing continuation selection screen.

FIG. 13 is a diagram showing an example of a functional structure of a multifunction device 1 according to a second embodiment. FIG. 14 is a diagram showing an example of a functional structure of an authentication server 2 according to the second embodiment. FIG. 15 shows an example of contents of use approval/disapproval information 75. FIG. 16 shows an example of a menu selection screen HG1. FIG. 17 shows an example of a processing halt notification screen HG2. FIG. 18 shows an example of a processing continuation selection screen HG3.

Next, the second embodiment is described. In FIGS. 13-24, elements denoted by the same reference numerals as those in the first embodiment (FIGS. 1-12) basically have the same functions as elements in the first embodiment. Hereinafter, an explanation will be made with emphasis on elements not provided in the first embodiment and elements having different functions from the elements in the first embodiment. An explanation is sometimes omitted of matters as same as in the first embodiment.

The whole structure of a program sharing system 100 and a hardware structure of each of the multifunction device 1, the authentication server 2 and a program server 3 are the same as in the case of the first embodiment. The program sharing system 100 can be provided with plural multifunction devices 1 and plural program servers 3.

On a magnetic storage device 1f are installed, as an operating system (OS), programs and data for realizing functions of various portions including a processing execution portion 101, an API call control portion 102, an API management portion 103, a program obtaining portion 104, a use approval/disapproval information obtaining portion 105B, a use approval/disapproval information database 106B and a user confirmation portion 107, all of which are shown in FIG. 13. Stated differently, these functions form an MFP core portion 12 that is a central portion of the multifunction device 1.

As shown in FIG. 14, the authentication server 2 includes an external communication portion 201, a data management portion 202 and a use approval/disapproval information database 203B, and manages the use approval/disapproval information 75. The authentication server 2 may be managed by a maker of the multifunction device 1 or an administrator of the multifunction device 1. Contents of the use approval/disapproval information 75 are described later. The functional structure of the program server 3 is similar to the case of the first embodiment shown in FIG. 4.

Hereinafter, regarding the program server 3 and each unit of each of the multifunction device 1 and the authentication server 2 that are shown in FIGS. 13 and 14, an explanation is focused on points different from the case of the first embodiment.

A touchscreen control portion 123 displays operation screens or a setting screen that are shown in FIGS. 16, 17 and 18 or other screens, determines a position where a user MU touches in a touchscreen 1j and performs other processing. In other words, the touchscreen control portion 123 performs processing relating to a user interface.

An API management portion 103 manages APIs for invoking functions of each unit included in the processing execution portion 101, and functions of each unit included in each of the program obtaining portion 104, the use approval/disapproval information obtaining portion 105B and the use approval/disapproval information database 106B.

The use approval/disapproval information database 203B shown in FIG. 14 stores the use approval/disapproval information 75 (751, 752 . . . ) for each user MU using the multifunction device 1 provided in the program sharing system 100. The use approval/disapproval information 75 includes user information 75a, available device information 75b and available program information 75c, as shown in FIG. 15.

The user information 75a in the use approval/disapproval information 75 includes a user name of a user MU, a user ID for identifying the user MU and a password used at the time of identifying that the user MU is an authorized user. The available device information 75b represents device(s) that the user MU can use out of devices including a multifunction device provided in the program sharing system 100, a personal computer and a workstation.

The available program information 75c specifies program name(s) of program(s) that the user MU can use out of executable programs by the devices (hereinafter sometimes referred to as "available program(s)"). Further, the available program information 75c represents a list of API functions for functionality that the user MU can use (call) when using the available programs in the form of an available API list UL. In other words, according to the available program information 75c, even if permission of a program PG to be used is given to the user MU, when processing is intended to be executed based on an API function that is not included in the available API list UL, the processing based on the program PG stops.

It is desirable that a person who is familiar with technique or security relating to a multifunction device (an administrator of the multifunction device 1, for example) sets the use approval/disapproval information 75. A user MU without the use approval/disapproval information 75 informs the administrator of the multifunction device 1 or others of his/her name and requests the administrator to issue the use approval/disapproval information 75 and to register the user MU in the use approval/disapproval information database 203B. Responding to the request, the administrator determines access privileges to be given to the user MU in accordance with technical knowledge and reliability of the user MU, then to set the available device information 75b and the available program information 75c in the use approval/disapproval information 75.

The use approval/disapproval information obtaining portion 105B obtains the use approval/disapproval information 75 of a user MU using the multifunction device 1 from the authentication server 2 to store the same in the use approval/disapproval information-database 106B. The use approval/disapproval information 75 is obtained in the following procedure. A user MU using the multifunction device 1 enters his/her user ID and password in a logon screen displayed on the touchscreen 1j shown in FIG. 2. The entered user ID and password are transmitted to the authentication server 2, and thereby, the use approval/disapproval information 75 is requested.

In the authentication server 2, the data management portion 202 shown in FIG. 14 extracts use approval/disapproval information 75 including user information 75a having a user ID and a password identical to the received user ID and password out of the use approval/disapproval information 75 stored in the use approval/disapproval information database 203B. It is checked whether or not the device name of the multifunction device 1 which requests the use approval/disapproval information 75 is specified in the available device information 75b of the extracted use approval/disapproval information 75. When the device name is specified, the external communication portion 201 sends the extracted use approval/disapproval information 75 to the multifunction device 1 that made the request. Thus, logon to the multifunction device 1 by the user MU is completed.

When the use approval/disapproval information 75 is not extracted or when the device name of the multifunction device 1 is not specified, the external communication portion 201 notifies the user MU that the user MU is not authorized to use the multifunction device 1. On this occasion, the user MU cannot logon to the multifunction device 1 and is not permitted to use the multifunction device 1.

On the program database 303 (see FIG. 4) in the program server 3 are stored programs PG created by creators CR as program files 73. These programs PG are used after being downloaded onto the multifunction device 1.

When the multifunction device 1 is expanded, new programs PG for the expansion are downloaded from the program server 3.

Also, when a user MU intends to make the multifunction device 1 perform processing, programs PG are downloaded. In this case, when the user MU touches a button corresponding to desired processing (type of jobs) to select the desired processing on the menu selection screen HG1 in FIG. 16, unless the multifunction device 1 saves a program PG required for execution of the processing, the multifunction device 1 downloads the corresponding program PG from the program server 3. For this purpose, each button is associated with a storage location of the program PG necessary for execution of the corresponding processing (a directory in the multifunction device 1, an URL of the program server 3 or the like) and with a file name of a program file 73 relating to the program PG. On each button is indicated brief description of processing contents such as "fax transmission" or a program name, so that a user can recognize a program PG to be started at the time of selecting the button.

The API call control portion 102 shown in FIG. 13 checks whether or not a program name of a program PG to be started is specified in the use approval/disapproval information 75 of the user MU. When the program name is not specified, it is judged that permission of the use of the program PG is not given to the user MU, and the program PG is not started. When specified, processing is performed sequentially based on codes described on the program PG. Since only buttons of available programs PG are displayed on the menu selection screen HG1, the check mentioned above may be omitted.

During this series of processing based on the program PG, when a code (a processing code) for processing to be executed next is an API function, the API call control portion 102 checks whether or not permission of the use of the API function is given to the user MU. More particularly, the API call control portion 102 checks whether or not the API function is specified in the available API list UL of the program PG, the available API list UL being included in the use approval/disapproval information 75 of the user MU.

When the permission of the use is given, i.e., the API function is specified, the API call control portion 102 issues a command to call functionality corresponding to the API function and execute predetermined processing for the API management portion 103. The API management portion 103 controls the processing execution portion 101 based on such a command and, if necessary, on the designated parameters.

When deciding that no permission of the use is given, the API call control portion 102 does not call the corresponding API function to halt processing by the program PG. Then, the touchscreen 1j displays an error message indicating that unpermitted and unauthorized processing was intended to be executed as the processing halt notification screen HG2 shown in FIG. 17. Alternatively, it is possible to make a user select whether or not functionality corresponding to the API function may be called to continue the processing.

When the next processing code is not an API function, a command is issued to each of the portions of the multifunction device 1 without involving the APIs. Thus, processing by each unit of the multifunction device 1 in FIG. 2 is executed.

There are cases where predetermined data need updating, or data need adding to a predetermined memory area at the time of calling functionality corresponding to an API function to execute processing. The cases include, for example, a case where contents of an address book (individual information 72) are modified or deleted, and a case where the individual information 72 is added to an address book database DB1. In these cases, the user confirmation portion 107 confirms whether or not processing such as update may be executed for the user MU.

More specifically, the processing continuation selection screen HG3 as shown in FIG. 18 is displayed on the touchscreen 1j (see FIG. 2). When a "continue" button is selected, the user confirmation portion 107 instructs the API management portion 103 to perform processing such as update. When an "abandon" button is selected, the user confirmation portion 107 stops processing based on the program PG, or skips the processing such as update to continue the remaining processing.

Figure 19:
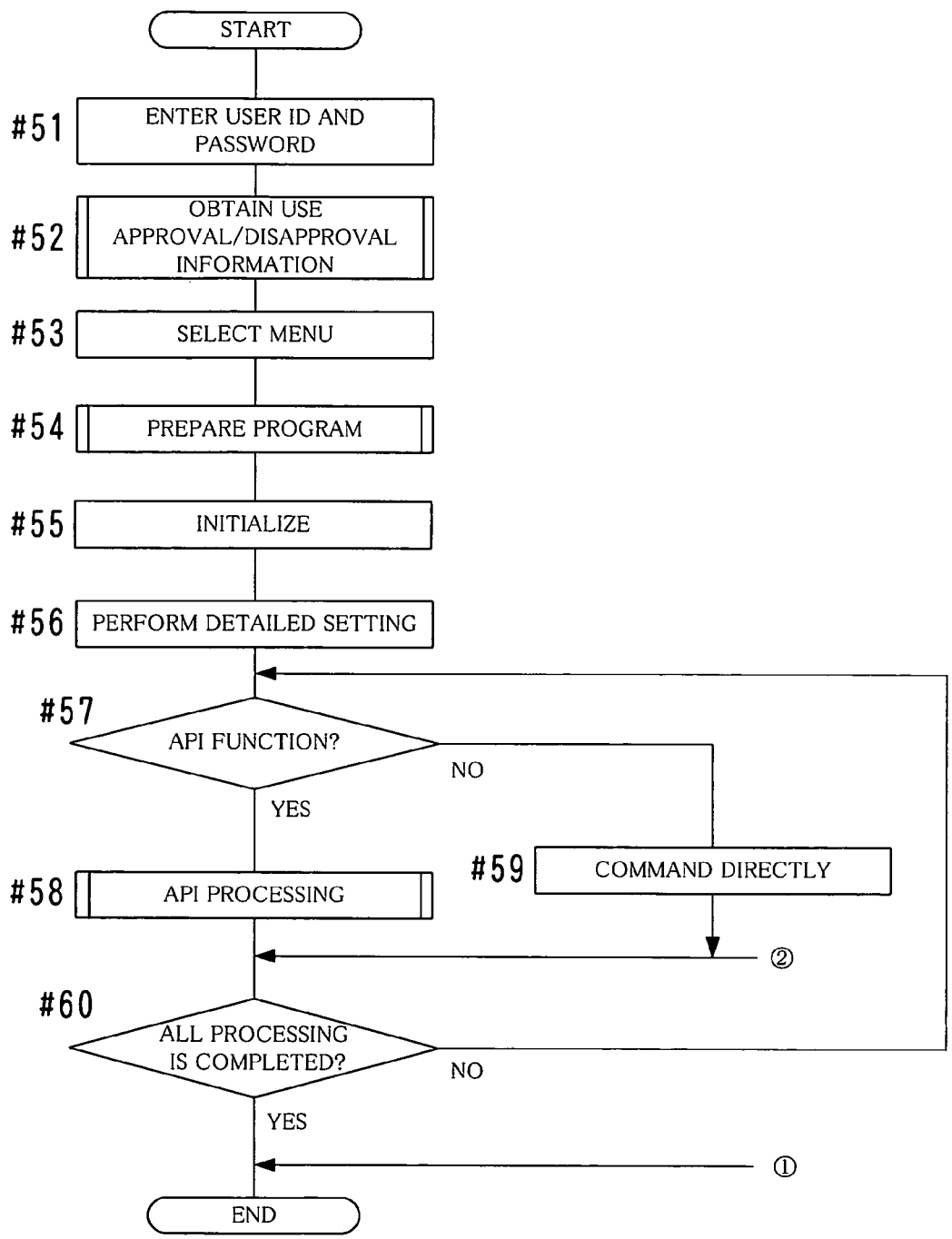
FIG. 19 is a flowchart showing an example of processing in the program sharing system at the time of executing a program.
Figure 20:
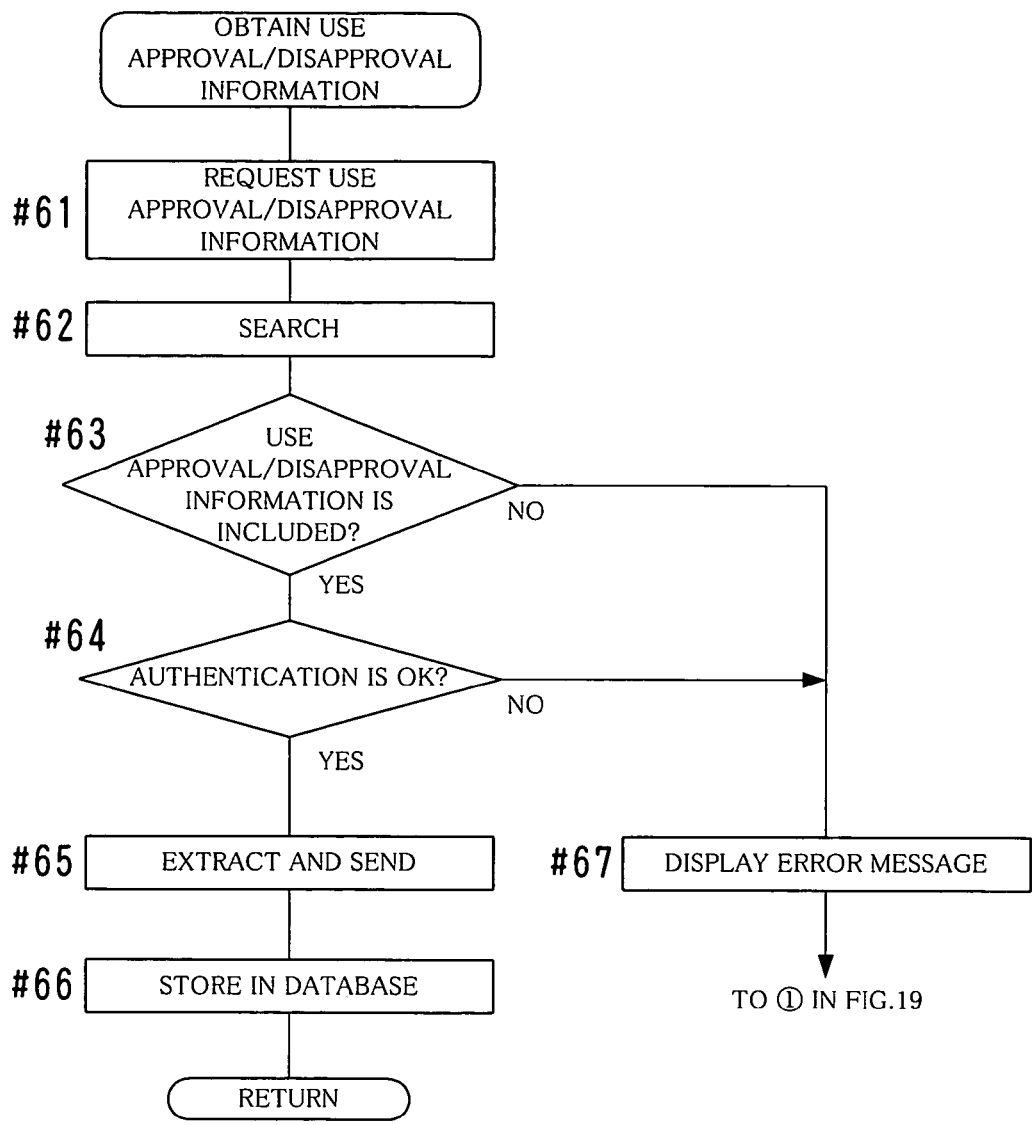
FIG. 20 is a flowchart showing an example of processing of obtaining the use approval/disapproval information.
Figure 21:
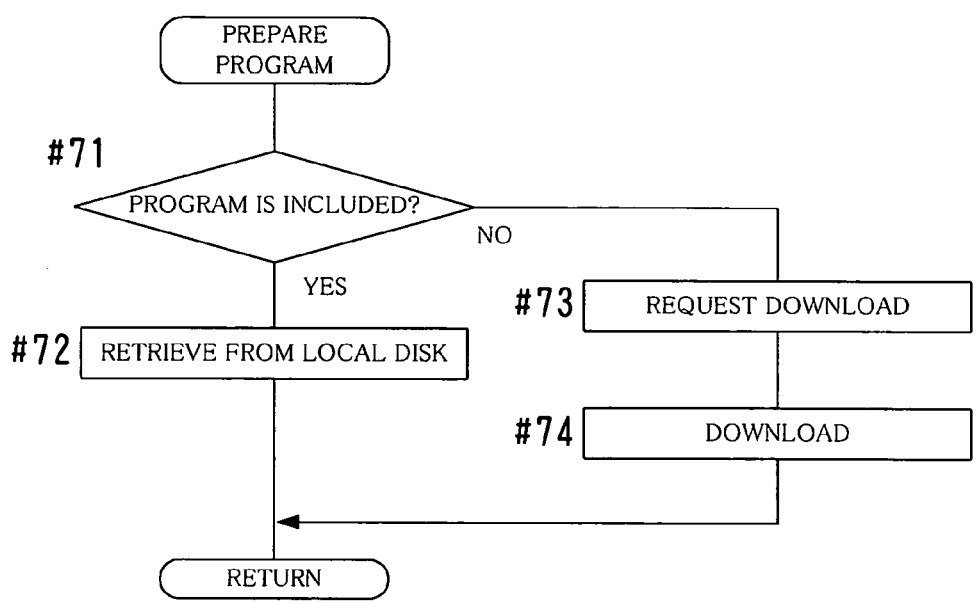
FIG. 21 is a flowchart showing an example of preparation processing of a program.
Figure 22:
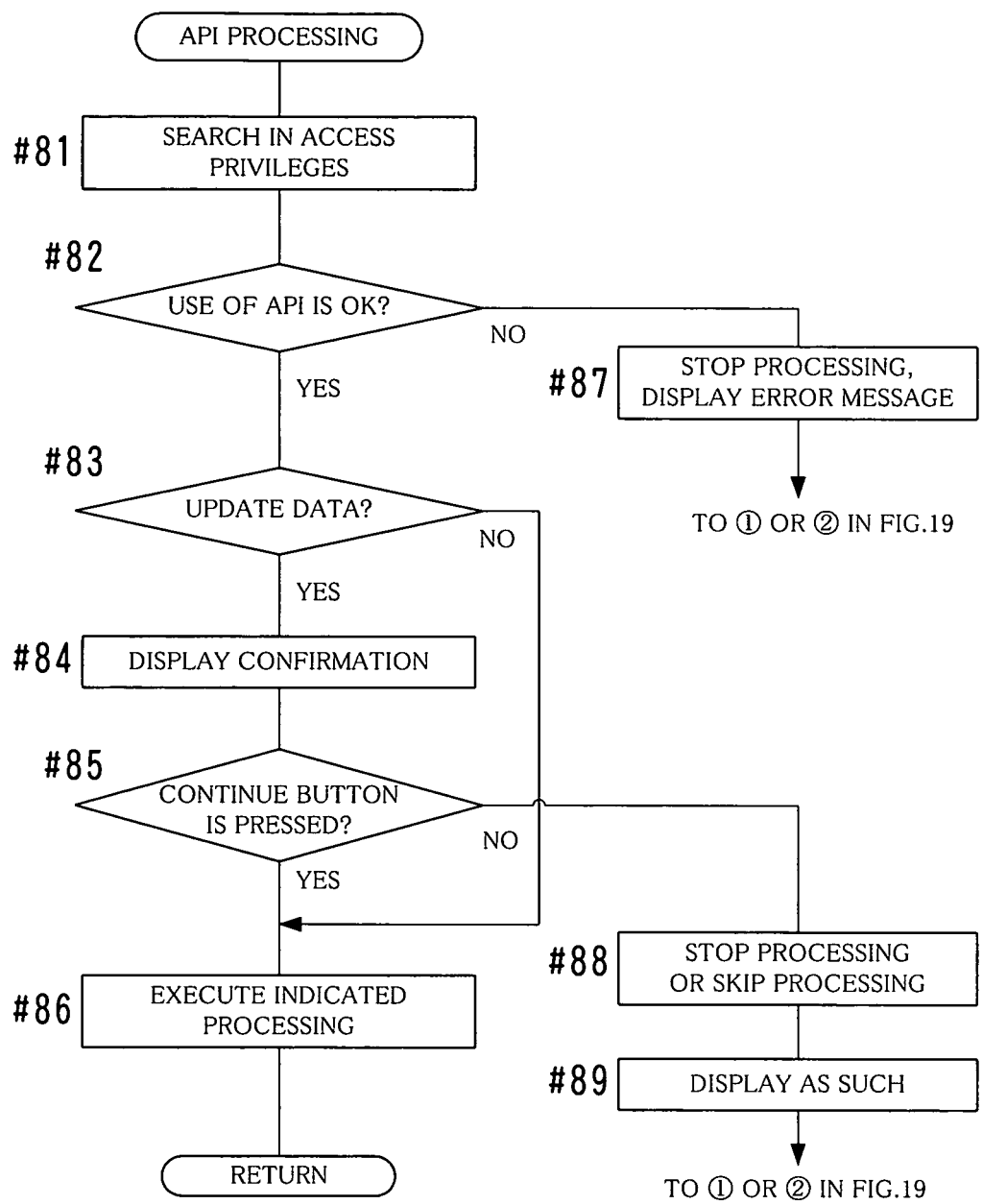
FIG. 22 is a flowchart showing an example of API processing.
Figure 23:
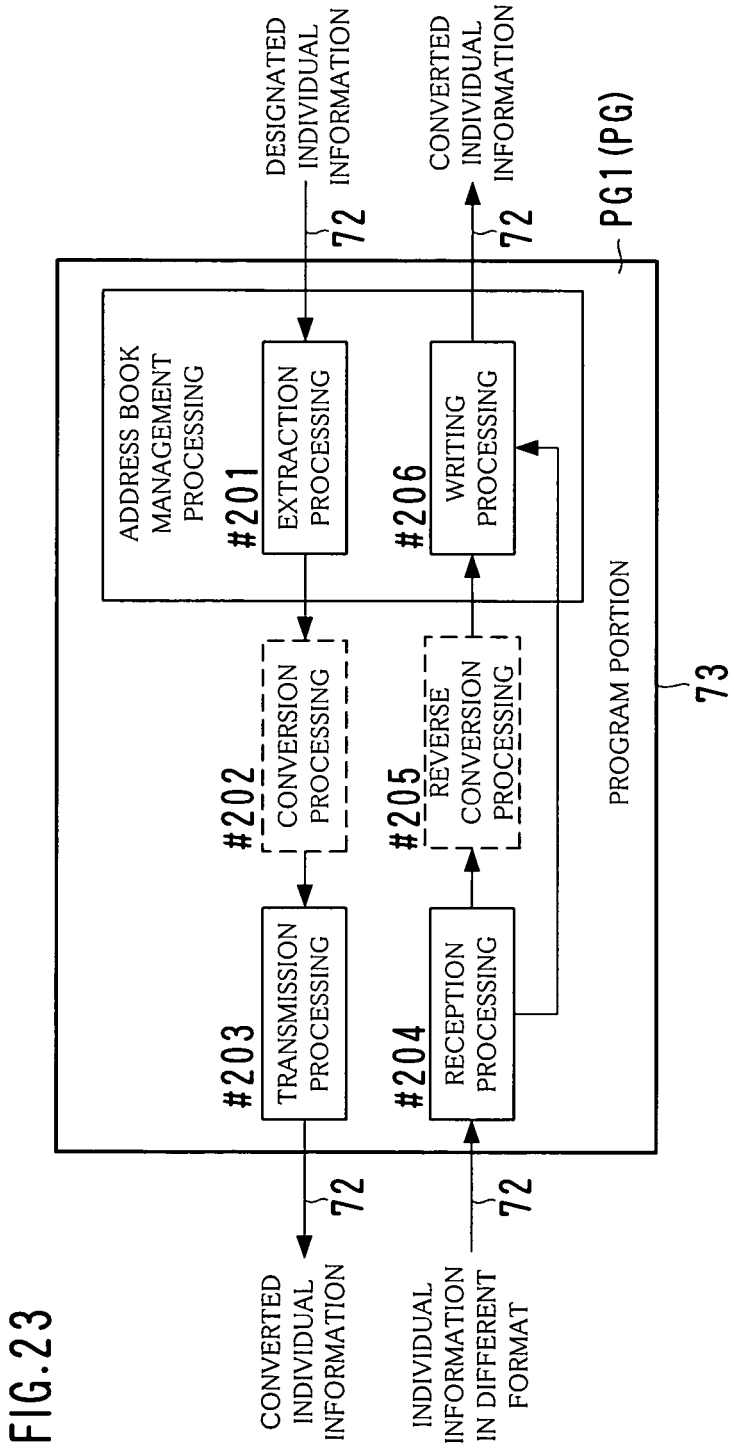
FIG. 23 is a diagram showing an example of a program file structure and processing contents of an address book management program according to the second embodiment.
Figure 24:
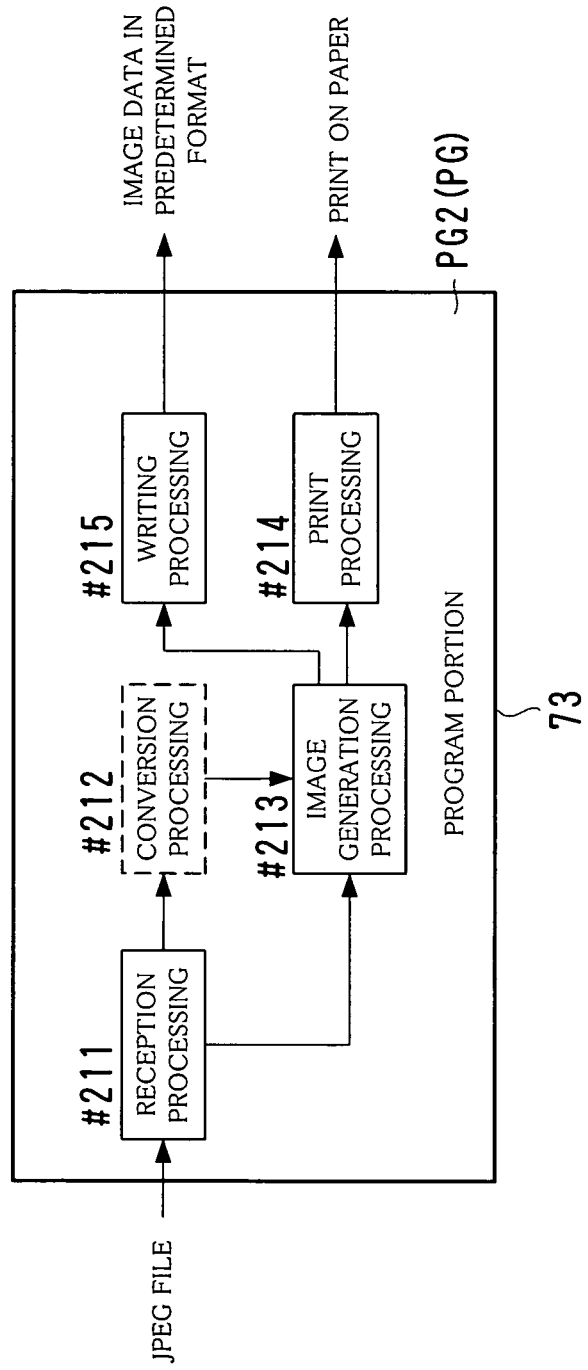
FIG. 24 is a diagram showing an example of a program file structure and processing contents of an image processing program according to the second embodiment.

FIG. 19 is a flowchart showing an example of processing in the program sharing system 100 at the time of executing a program PG. FIG. 20 is a flowchart showing an example of processing of obtaining the use approval/disapproval information 75. FIG. 21 is a flowchart showing an example of preparation processing of a program. FIG. 22 is a flowchart showing an example of API processing. FIG. 23 is a diagram showing an example of a structure of a program file 73 and processing contents of an address book management program according to the second embodiment. FIG. 24 is a diagram showing an example of a structure of a program file 73 and processing contents of an image processing program according to the second embodiment. The CPU executes programs stored in a magnetic storage device, a ROM or others of each of the devices, so that each processing shown in FIGS. 19-22 is realized.

Next, an explanation is given of processing flow of each unit in the program sharing system 100 at the time of performing processing based on a program PG with reference to flowcharts.

A user MU enters his/her ID and password in the multifunction device 1 to be used (#51). The multifunction device 1 obtains the use approval/disapproval information 75 of the user MU according to the procedure shown in FIG. 20 (#52).

Referring to FIG. 20, the multifunction device 1 sends the entered user ID and password to the authentication server 2 to request the use approval/disapproval information 75 (#61). The authentication server 2 searches the use approval/disapproval information 75 having the same user ID as the sent user ID from the use approval/disapproval information database 203B (see FIG. 14) and extracts the same (#62).

When the use approval/disapproval information 75 is extracted (Yes in #63), it is judged whether or not the sent password is identical to a password represented in the extracted use approval/disapproval information 75, and whether or not the device name of the multifunction device 1 that made the request is specified in the available device information 75b of the use approval/disapproval information 75 (#64). When the passwords match and the device name is specified (Yes in #64), it is certified that the user MU is an authorized user and has authority of the use of the multifunction device 1, so that the authentication server 2 transmits the use approval/disapproval information 75 to the multifunction device that requested the same (#65). The multifunction device 1 stores (places) the received use approval/disapproval information 75 in the use approval/disapproval information database 106B in FIG. 13 (#66). Thus, logon to the multifunction device 1 by the user MU is completed.

In the event that the use approval/disapproval information 75 is not extracted (No in #63), that the passwords don't match or that the device name of the multifunction device 1 is not specified (No in #64), the authentication server 2 notifies the multifunction device 1 that authority of the use of the multifunction device 1 is not given to the user MU. The multifunction device 1 displays such a message on the touchscreen 1j (see FIG. 2) (#67). In this case, the user MU cannot logon to the multifunction device 1 and use the same.

Referring to FIG. 19, the multifunction device 1 displays a list of processing (type of jobs) that the user MU can use in the form of the menu selection screen HG1 (see FIG. 16) based on the use approval/disapproval information 75 of the user MU logged onto the multifunction device 1. When a desired button is selected on the menu selection screen HG1 (#53), a job arises and a program PG required for executing processing of the job is obtained in the procedure shown in FIG. 21 (#54).

Referring to FIG. 21, when already having the necessary program PG on the magnetic storage device 1f or the non-volatile memory 1e (Yes in #71), the multifunction device 1 retrieves the program PG from such a recording medium (#72). When the necessary program PG is not saved on such a recording medium (No in #71), the multifunction device 1 requests the program PG for the program server 3 (#73) and downloads the same (#74).

Referring to FIG. 19, the multifunction device 1 performs initialization for starting processing desired by the user MU by loading a program PG and an available API list UL for the program PG on a RAM 1b shown in FIG. 2 or the like (#55). The user MU performs detailed setting as required (#56). For instance, the user MU performs setting of a copy quantity, a destination of a facsimile, an enlargement ratio of an image size and others.

It is discriminated whether or not the first processing code described in the program PG is an API function (#57).

When the first processing code is not an API function (No in #57), a command is issued directly to each unit of the multifunction device 1 to execute exactly the same processing as instructions in the processing code, without involving the APIS, i.e., without the API call (#59). When the first processing code is an API function (Yes in #57), processing is performed through the APIs in the procedure shown in FIG. 22 (#58).

As shown in FIG. 22, it is checked whether or not the API function is specified in the available API list UL for the program PG (#81), the available API list being included in the use approval/disapproval information 75 (see FIG. 15).

When the API function is specified, it is decided that the permission of the use of the API function is given (Yes in #82), and an API call is performed for calling functionality corresponding to the API function to execute processing (#86). However, the API function is for invoking functionality of updating predetermined data or of adding data to a predetermined memory area (Yes in #83), prior to the API call, the processing continuation selection screen HG3 shown in FIG. 18 is displayed to seek confirmation as to whether to execute processing for the user MU (#84). Then, when the "continue" button is pressed (Yes in #85), the API call is performed (#86). When the "abandon" button is pressed (No in #85), processing based on the program PG is discontinued (#88) and notice of the discontinuation is displayed as the processing halt notification screen HG2 shown in FIG. 17 (#89). Alternatively, it is possible to skip the processing based on the API function and to continue processing based on the remaining processing codes.

On the other hand, when the API function is not specified in the available API list UL (No in #82), it is decided that the permission of the use of the API function is not given, so that processing based on the program PG halts (#87). In this case, the processing may be forced to be executed according to instructions of the user MU, or the processing may be skipped to continue processing based on the remaining processing codes.

Referring to FIG. 19, regarding the second and later processing codes described in the program PG, processing is executed in the procedure discussed above until all the processing is completed (Yes in #60).

According to the procedure described with reference to FIG. 22, programs PG1 and PG2 shown in FIGS. 23 and 24 respectively are executed as described below. In addition, solid line portions and dotted line portions are illustrated as portions for showing processing in FIGS. 23 and 24. The former means that a processing code for executing the processing is coded using API functions, while the latter means that coding for executing the processing is performed without using API functions.

The program PG1 shown in FIG. 23 is the address book management program for managing the individual information 72 stored in the address book database DB1 (see FIG. 2), i.e., the address book. The program PG1 enables to perform processing of transmitting the individual information 72 designated by a user MU to the external terminal device 6 and processing of adding the individual information 72 received from the external terminal device 6 to the address book database DB1.

It is supposed that a user MU of the multifunction device 1 is requested to send individual information 72 of a certain person to the external terminal device 6. The user MU touches a button corresponding to transmission processing (a "data transfer" button, for example) on the menu selection screen HG1 shown in FIG. 16 to start up a program PG, then to designate a name of the person and an e-mail address of the external terminal device 6 or an address on the network. So, the multifunction device 1 implements processing based on the program PG as follows.

The multifunction device 1 calls functionality corresponding to an API function for extraction processing to extract the individual information 72 of the person from the address book database DB1 (#201). Next, conversion processing is performed, so that the extracted individual information 72 is converted from a format adopted in the multifunction device 1 (hereinafter refereed to as a "standard format") into a format corresponding to the other party (a format of spreadsheet software, for example) (#202). This processing is, however, illustrated as a dotted line portion, i.e., this processing does not depend on an API function. Accordingly, the processing is executed without involving the APIs. Then, the multifunction device 1 calls functionality corresponding to an API function for transmission processing to send the converted individual information 72 to the external terminal device 6 (#203).

When the individual information 72 is transmitted to the multifunction device 1, the multifunction device 1 calls functionality corresponding to an API function for reception processing to store the individual information 72 in a predetermined memory area (#204). In the event that the received individual information 72 is not in the standard format, reverse conversion processing is performed, so that the individual information 72 is converted into the standard format (#205). Then, the multifunction device 1 calls functionality corresponding to an API function for writing processing to register the individual information 72 subjected to the reverse conversion as required on the address book database DB1 (#206). On this occasion, prior to the registration, the processing continuation selection screen HG3 shown in FIG. 18 is displayed to seek confirmation as to whether or not to register for the user MU (equivalent to #84 and #85 in FIG. 22).

The program PG2 shown in FIG. 24 is an image processing program for receiving image data from a terminal device to perform image processing or others. When an image file is transmitted to the multifunction device 1 during starting up the program PG2, the multifunction device 1 calls functionality corresponding to an API function for reception processing to store the image file in a predetermined memory area (#211).

In the event that a format of the image file is not supported by the multifunction device 1 (a JPEG file, a PDF file or other files, for example), conversion processing is performed, so that the image file is converted into the standard format (a format for page-description language such as a PCL, for example) (#212). The multifunction device 1 calls functionality corresponding to an API function for image generation processing to convert the image file into bit-mapped data (#213). When "printing" is set as an output mode, the multifunction device 1 calls functionality corresponding to an API function for print processing to print the image on a sheet of paper based on the bit-mapped data (#214). When "HDD" is set as an output mode, the multifunction device 1 calls functionality corresponding to an API function for writing processing to save the bit-mapped data on the image database DB2 (see FIG. 2) in the magnetic storage device 1f (#215). However, prior to saving into the image database DB2, confirmation as to whether or not to save is sought for the user MU (equivalent to #84 and #85 in FIG. 22).

Of each processing shown in FIGS. 23 and 24, with respect to processing to be performed after calling functionality corresponding to an API function, it is checked whether or not the processing is authorized processing before executing the processing (equivalent to #82 in FIG. 22).

According to the present embodiment, the use approval/disapproval information 75 is used to limit the use of the multifunction device 1 and programs PG according to a level of a user. Thereby, execution of unpermitted processing can be prevented in the multifunction device 1. Further, in the event that a code that is not permitted for a user is found during executing a program PG, processing is stopped or interrupted, ensuring that unauthorized processing can be prevented more reliably.

In the present embodiment, API functions for functionality that a user MU is permitted to use (call) are described (set) in the available program information 75c shown in FIG. 15. However, API functions for functionality prohibited from being used may be described. Alternatively, approval/disapproval setting may be performed by classifying all functionality into functionality permitted to be used, functionality available when a user instructs that the functionality may be called, functionality prohibited from being used irrespective of user's intention or other functionality.

It is also possible to check whether or not an unpermitted code, i.e., an API function for calling functionality that is not allowed for a user MU is included in a program PG at a time before starting the program PG instead of before processing for each code included in the program PG. Alternatively, the check may be made both before processing for each code and before starting the program PG.

In the present embodiment, as shown in FIG. 15, the available API list UL is prepared for each program PG. However, one available API list UL may be shared by plural programs PG. Of users MU employing the program sharing system 100, users MU that have the same available programs PG, the same available API functions in these programs PG and the same available device may share one piece of use approval/disapproval information 75.

According to the present embodiment, although a button for starting up a program PG that a logged-on user is not permitted to use is not displayed on the menu selection screen HG1 in FIG. 16, such a button may be displayed. In this case, such a button is displayed in gray and, even if the button is selected, it is displayed and notified that authority of the use (authority of the execution) of the program PG is not given. The status of authority of the use can be discriminated by the use approval/disapproval information 75 of the user.

The use approval/disapproval information 75 may be described using a language such as an extensible markup language (XML) or other languages. Further, the use approval/disapproval information 75 may be registered in a management information base (MIB).

The present invention can apply to a multifunction device 1 for performing processing based on programs PG other than the programs PG1 and PG2 that are shown in FIGS. 23 and 24.

For example, the present invention can apply to a multifunction device 1 installed in a common space where many workers gather for jobs, e.g., a company, a tenant building or the like, as follows.

The multifunction device 1 is provided with APIs that can call various functionality (functions) for accounting processing of use fees of the multifunction device 1. More specifically, there are predefined an API function for recording a count (a counter value) such as a copy quantity, the number of times of facsimile transmission or usage of a scanner in the accounting information database DB3 shown in FIG. 2 for each user or each affiliation (a user belongs to), an API function for referring to contents of the accounting information database DB3, an API function for referring to rules at the time of counting, an API function for transmitting an obtained counter value to an external accounting server 5 (see FIG. 1) and an API function for obtaining a setting value indicating what kind of setting is made on each job arose at the time of using the multifunction device 1 by each user, for example, duplex printing, 2-in-1 printing, color printing or others, or for obtaining information for each page.

A maker or a dealer of the multifunction device 1 creates programs PG for realizing new advanced features using such APIs, improves programs PG that are already distributed or fix bugs of programs PG that are already distributed to provide distribution agents (customers) of the multifunction device 1 with the programs PG by publishing the programs PG on the program server 3. For example, the maker or the dealer provides a program PG for making a list of usage for each user based on the referred counter value to transmit the prepared list to the accounting server 5 of an administration department in a company or a caretaker of a tenant building at regular intervals (every week, for example). Meanwhile, an administrator of the multifunction device 1 redefines use approval/disapproval information of each user in accordance with a technical skill, reliability or a professional title of each user.

The present invention can apply to devices other than multifunction devices (multifunction peripherals), for example, a personal computer, a workstation, a personal digital assistant (PDA), a cellular phone, a home appliance with a function of the Internet (what is commonly called information appliance) or others as long as such devices have APIs.

Structures, processing contents and processing order of each part or whole part of the program sharing system 100, the multifunction device 1, the authentication server 2 and the program server 3 can be varied as required within the scope of the present invention.

What is claimed is:

1. A multifunction device being able to execute a program obtained from an external device by an operation of a user comprising:
   a program obtaining portion for obtaining a program from an external device;
   a processing portion for executing processing;
   a function calling portion for invoking an application program interface (API) function corresponding to a code described in a program out of API functions included in the processing portion;
   a use approval/disapproval information memory portion for memorizing use approval/disapproval information indicating whether a creator indicated by creator information included in the program obtained by the program obtaining portion is permitted by an authorization of an administrator of the multifunction device to use the API function of the multifunction device called from the obtained program, the creator being different from the user operating the multifunction device;
   a use approval/disapproval judge portion for determining whether or not the creator indicated by creator information included in the obtained program is authorized to use the function corresponding to the API function of the multifunction device based on the use approval/disapproval information if the function in the obtained program corresponds to the API function of the multifunction device; and
   a control portion for controlling the function calling portion;
   wherein if the function in the obtained program corresponds to an API function of the multifunction device, the control portion controls the function calling portion so that the API function is called when the use approval/disapproval judge portion determines that the creator indicated by the creator information of the obtained program is authorized to use the API function corresponding to the code described in the obtained program, and processing based on the obtained program is stopped when the use approval/disapproval judge portion determines that the creator indicated by the creator information of the obtained program is not authorized to use the API function;
   wherein if the function in the obtained program does not correspond to an API function of the multifunction device, the control portion controls to execute the function.

2. The multifunction device according to claim 1, wherein the function calling portion is a portion for managing an application program interface of an operating system of the multifunction device.

3. The multifunction device according to claim 1, further comprising:
   an authenticity judge portion for judging whether a program is an authorized program created by an authorized creator or an unauthorized program created by an unauthorized creator; and
   a creator information memory portion for memorizing first creator information used for identifying a creator of a program, the first creator information being prepared for each creator of a program,
   wherein
   the program obtaining portion obtains second creator information used for identifying a creator who created a program along with the program,
   the authenticity judge portion determines a program obtained by the program obtaining portion as an authorized program created by an authorized creator when the creator information memory portion memorizes the first creator information having the same contents as the second creator information obtained together with the program, and determines the program obtained by the program obtaining portion as an unauthorized program created by an unauthorized creator when the creator information memory portion does not memorize the first creator information having the same contents as the second creator information obtained together with the program, and
   the control portion controls the processing portion so that, with respect to a program determined to be an authorized program by the authenticity judge portion, processing is executed in accordance with the program, and controls the processing portion so that, with respect to a program determined to be an unauthorized program, processing based on the program is stopped.

4. The multifunction device according to claim 1, wherein the creator information is described in a header of the program.

5. The multifunction device according to claim 1, wherein the creator information indicates at least one of a creator name and a creator ID.

6. A method for controlling a multifunction device being able to execute a program obtained from an external device by an operation of user, the method comprising:
   obtaining a program from an external device;
   loading use approval/disapproval information on a memory of the multifunction device, the information indicating whether a creator indicated by creator information included in the obtained program is permitted by an authorization of an administrator of the multifunction device to use an application program interface (API) function of the multifunction device called from the obtained program, the creator being different from the user operating the multifunction device;
   judging whether or not the creator indicated by the creator information included in the obtained program is authorized to use the function corresponding to the API function of the multifunction device based on the use approval/disapproval information if the function in the obtained program corresponds to the API function of the multifunction device; and controlling the processing portion;

wherein if the function in the obtained program corresponds to an API function of the multifunction device, the processing portion is controlled so that the API function is called to execute processing when judging that the creator indicated by the creator information of the obtained program is authorized to use the API function corresponding to the code included in the obtained program, and processing based on the program is stopped when judging that the creator indicated by the creator information of the program is not authorized to use the API function; and wherein if the function in the obtained program does not correspond to an API function of the multifunction device, the processing portion is controlled to execute the function.

7. The method for controlling the multifunction device according to claim 6, wherein the creator information is described in a header of the program.

8. The method for controlling the multifunction device according to claim 6, wherein the creator information indicates at least one of a creator name and a creator ID.

9. A non-transitory computer readable medium storing a control program used for a multifunction device being able to execute a program obtained from an external device by an operation of user, the control program making the multifunction device perform the processing of:

obtaining a program from an external device;

loading use approval/disapproval information on a memory, the information indicating whether a creator indicated by creator information included in the obtained program is permitted by an authorization of an administrator of the multifunction device to use an application program interface (API) function of the multifunction device called from the obtained program, the creator being different from the user operating the multifunction device;

judging whether or not the creator indicated by the creator information included in the obtained program is authorized to use the function corresponding to the API function of the multifunction device based on the use approval/disapproval information if the function in the obtained program corresponds to the API function of the multifunction device; and controlling the processing portion;

wherein if the function in the obtained program corresponds to an API function of the multifunction device, the processing portion is controlled so that the function is called to execute processing when judging that the creator indicated by the creator information of the obtained program is authorized to use the API function corresponding to the code included in the obtained program, and processing based on the obtained program is stopped when judging that the creator indicated by the creator information of the obtained program is not authorized to use the API function wherein if the function in the obtained program does not correspond to an API function of the multifunction device, the processing portion is controlled to execute the function.

10. The computer readable medium according to claim 9, wherein the creator information is described in a header of the program.

11. The computer readable medium according to claim 9, wherein the creator information indicates at least one of a creator name and a creator ID.

* * * * *